United States Patent
Ode

(10) Patent No.: US 9,585,074 B2
(45) Date of Patent: Feb. 28, 2017

(54) WIRELESS COMMUNICATION SYSTEM, MOBILE STATION, BASE STATION, AND WIRELESS COMMUNICATION METHOD

(71) Applicant: FUJITSU LIMITED, Kawasaki-shi, Kanagawa (JP)

(72) Inventor: Takayoshi Ode, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 109 days.

(21) Appl. No.: 14/596,715

(22) Filed: Jan. 14, 2015

(65) Prior Publication Data

US 2015/0124780 A1 May 7, 2015

Related U.S. Application Data

(63) Continuation of application No. PCT/JP2012/068889, filed on Jul. 25, 2012.

(51) Int. Cl.
*H04L 1/00* (2006.01)
*H04W 36/18* (2009.01)
(Continued)

(52) U.S. Cl.
CPC ........... *H04W 36/18* (2013.01); *H04W 36/32* (2013.01); *H04W 36/0016* (2013.01); *H04W 36/04* (2013.01); *H04W 84/045* (2013.01)

(58) Field of Classification Search
CPC .. H04W 64/00; H04W 4/02; H04L 29/08657; H04L 29/08936; G01S 5/02; G01S 5/0252; G01S 5/14
(Continued)

(56) References Cited

U.S. PATENT DOCUMENTS

| 6,282,427 B1 * | 8/2001 | Larsson | G01S 1/04 342/450 |
| 2007/0123272 A1 * | 5/2007 | Ida | H04W 52/283 455/456.1 |

(Continued)

FOREIGN PATENT DOCUMENTS

| JP | 2004-096169 A | 3/2004 |
| JP | 2004-166126 A | 6/2004 |

(Continued)

OTHER PUBLICATIONS

International Search Report issued for corresponding International Patent Application No. PCT/JP2012/068889, mailed Oct. 30, 2012, with an English translation.

*Primary Examiner* — Dady Chery
(74) *Attorney, Agent, or Firm* — Myers Wolin, LLC

(57) ABSTRACT

A wireless communication system includes: a mobile station; a first base station that communicates with the mobile station; and a second base station that communicates with the mobile station. The mobile station includes a measuring unit, a calculating unit, and a sending unit. The measuring unit measures a location of the mobile station. The calculating unit calculates, by using location information measured by the measuring unit and location information on the first base station, a distance between the mobile station and the first base station. The sending unit sends, to the second base station based on the distance calculated by the calculating unit and a predetermined threshold, a request signal that is used to request setting of a channel between the second base station and the first base station.

10 Claims, 30 Drawing Sheets

(51) Int. Cl.
*H04W 36/32* (2009.01)
*H04W 36/04* (2009.01)
*H04W 84/04* (2009.01)
*H04W 36/00* (2009.01)

(58) Field of Classification Search
USPC ..... 370/329, 330, 331, 332; 455/456, 456.1,
455/456.2, 456.3, 422.1, 423, 456.5,
455/456.6, 457, 525
See application file for complete search history.

(56) References Cited

U.S. PATENT DOCUMENTS

| | | |
|---|---|---|
| 2009/0098872 A1 | 4/2009 | Deshpande et al. |
| 2009/0143065 A1* | 6/2009 | Mattila ............... H04L 41/06 |
| | | 455/423 |
| 2010/0173661 A1 | 7/2010 | Miyazaki et al. |
| 2010/0267385 A1 | 10/2010 | Iwamura et al. |
| 2011/0003595 A1 | 1/2011 | Shan |
| 2011/0077009 A1 | 3/2011 | Iwamura et al. |
| 2011/0077045 A1 | 3/2011 | Iwamura et al. |
| 2011/0081909 A1 | 4/2011 | Iwamura et al. |
| 2011/0092204 A1 | 4/2011 | Iwamura et al. |

FOREIGN PATENT DOCUMENTS

| | | |
|---|---|---|
| JP | 2009-260448 A | 11/2009 |
| JP | 2009-284432 A | 12/2009 |
| JP | 2009-290909 A | 12/2009 |
| JP | 2010-161638 A | 7/2010 |
| JP | 2010-258783 A | 11/2010 |
| JP | 2011-501527 A | 1/2011 |
| JP | 2011-517164 A | 5/2011 |
| JP | 2012-010242 A | 1/2012 |
| WO | 2004/057903 A1 | 7/2004 |

* cited by examiner

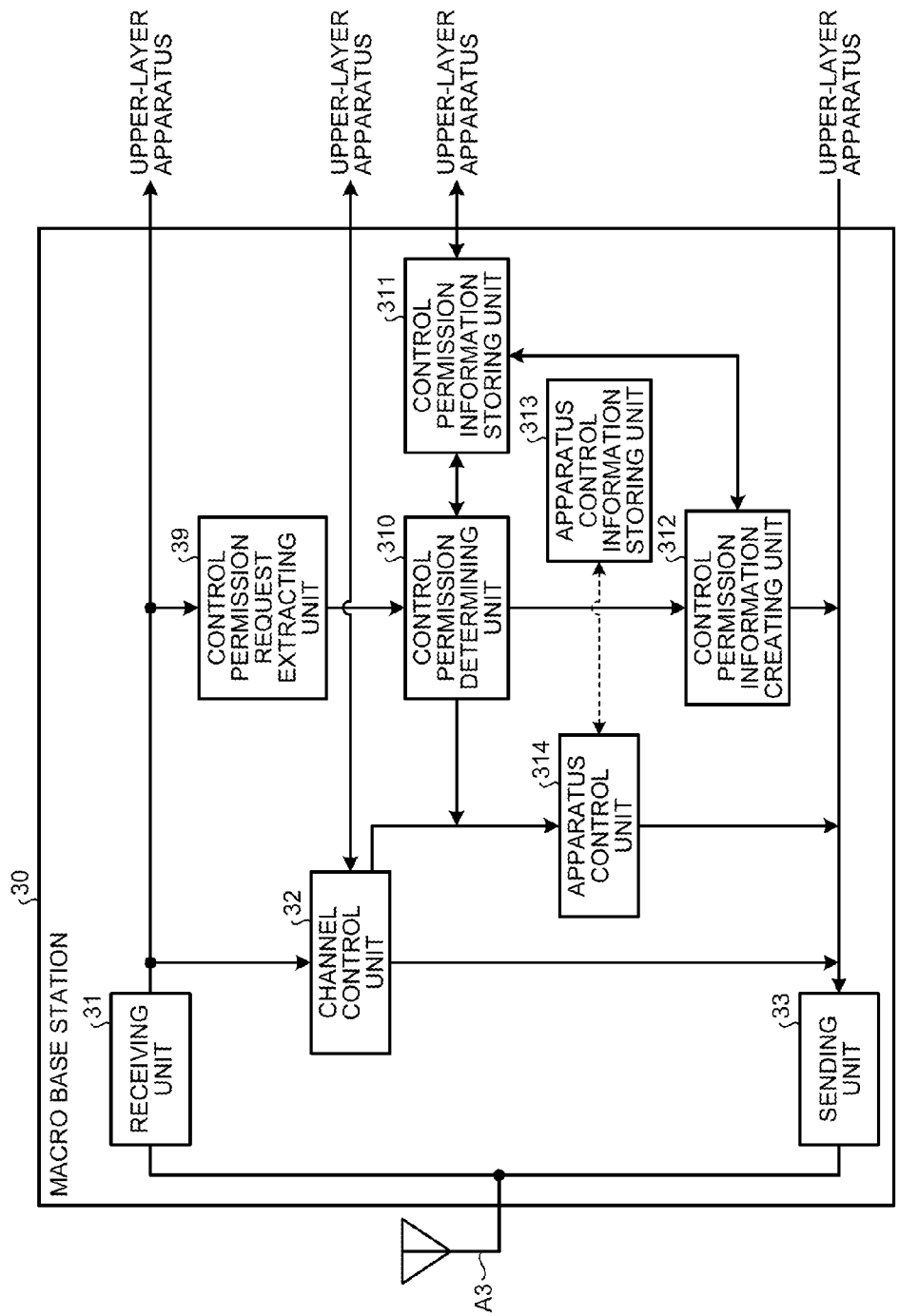

WIRELESS COMMUNICATION SYSTEM, MOBILE STATION, BASE STATION, AND WIRELESS COMMUNICATION METHOD

CROSS-REFERENCE TO RELATED APPLICATION

This application is a continuation of International Application No. PCT/JP2012/068889, filed on Jul. 25, 2012 and designating the U.S., the entire contents of which are incorporated herein by reference.

FIELD

The embodiments discussed herein are related to a wireless communication system, a mobile station, a base station, and a wireless communication method.

BACKGROUND

In recent years, wireless communication terminals, such as smart phones, are becoming rapidly spread. Accordingly, the traffic between terminals and a network is increased and thus a load applied to a dedicated network, such as Asynchronous Transfer Mode (ATM) network, is increased. As a countermeasure against this increase, for example, telecommunications carriers use a method in which small size base stations (for example, femto base stations) having a communication area smaller than normal base stations (for example, macro base stations) are placed in offices or homes and the traffic is saved in a public network, such as the Internet or the like, via the femto base station. In addition to the wireless communication standard, such as Wideband-Code Division Multiple Access (W-CDMA) or Long Term Evolution (LTE), the use of the femto base stations in wireless LAN (for example, IEEE 802.16) or WiFi (registered trademark, for example, IEEE 802.11) is studied. In particular, the adoption of the femto base stations that use a wireless LAN that effectively reduces the wireless traffic is promising as load distribution measurement (i.e., offload) of the traffic.

Patent Document 1: International Publication Pamphlet No. WO 2004/057903
Patent Document 2: Japanese Laid-open Patent Publication No. 2009-260448
Patent Document 3: Japanese Laid-open Patent Publication No. 2009-284432

However, the related technology described above has the following problem. Namely, in order to reduce the load applied to a dedicated network, a wireless communication terminal (hereinafter, referred to as a "mobile station") is handed over from the base station that is connected to the dedicated network to a small size base station (hereinafter, referred to as a "femto base station") that is connected to the public network in accordance with a user moving to an office or home. However, because the dedicated network and the public network are connected via a large number of upper-layer apparatus or paths, when a handover is performed, a connection path needs to be greatly changed in order to use an optimum path. Furthermore, in accordance with a change in the connection path, data that is targeted for communication needs to be transferred or retransmission. Furthermore, the handover described above is performed between both the networks and is a handover or a hard handover in which a channel is temporarily disconnected and then connected again. Consequently, the time needed to set a channel with a base station in the public network becomes longer than the time needed to set a channel with a base station in the dedicated network.

Furthermore, if a mobile station is not present in a communication area of a femto base station for a long time due to a user is away from the area, the femto base station stops or intermittently operates some function in order to save electrical power. In such a case, in order for the mobile station is handed over from a base station that is connected to a dedicated network to the femto base station, the femto base station needs to perform control such that the operation mode is returned to a normal operation mode from an electrical power saving operation mode. Consequently, when the femto base station detects that the mobile station enters the area of the femto base station, the femto base station performs control of, for example, synchronization of operation timing of each function, adjusting transmission electrical power in order to reduce the interference with the other base stations, or the like. The time needed to set a channel with a base station in a public network, i.e., a femto base station, due to this control is longer than that in a dedicated network. Namely, the time needed to perform a handover is longer than that performed between the base stations that are connected in the same network due to any one of the above reasons described above, which causes a decrease in a transmission speed of the mobile station.

SUMMARY

According to an aspect of the embodiments, a wireless communication system includes: a mobile station; a first base station that communicates with the mobile station; and a second base station that communicates with the mobile station. The mobile station includes a measuring unit that measures a location of the mobile station, a calculating unit that calculates, by using location information measured by the measuring unit and location information on the first base station, a distance between the mobile station and the first base station, and a first sending unit that sends, to the second base station based on the distance calculated by the calculating unit and a predetermined first threshold, a request signal that is used to request setting of a channel between the second base station and the first base station. The second base station includes a first receiving unit that receives the request signal sent by the first sending unit, a first control unit that sets, when the request signal is received by the first receiving unit, the channel between the second base station and the first base station, and a second sending unit that sends, to the first base station by using the channel set by the first control unit, a notification signal that indicates notification of the setting of the channel. The first base station includes a second receiving unit that receives the notification signal sent by the second sending unit, and a second control unit that sets, when the notification signal is received by the second receiving unit, the channel between the first base station and the second base station.

BRIEF DESCRIPTION OF DRAWINGS

FIG. 34 is a schematic diagram illustrating an example of the functional configuration of a macro base station according to the ninth embodiment.

DESCRIPTION OF EMBODIMENTS

Preferred embodiments will be explained with reference to accompanying drawings. The wireless communication system, the mobile station, the base station, and the wireless communication method are not limited to the embodiments described below.

[a] First Embodiment

Figure 1:
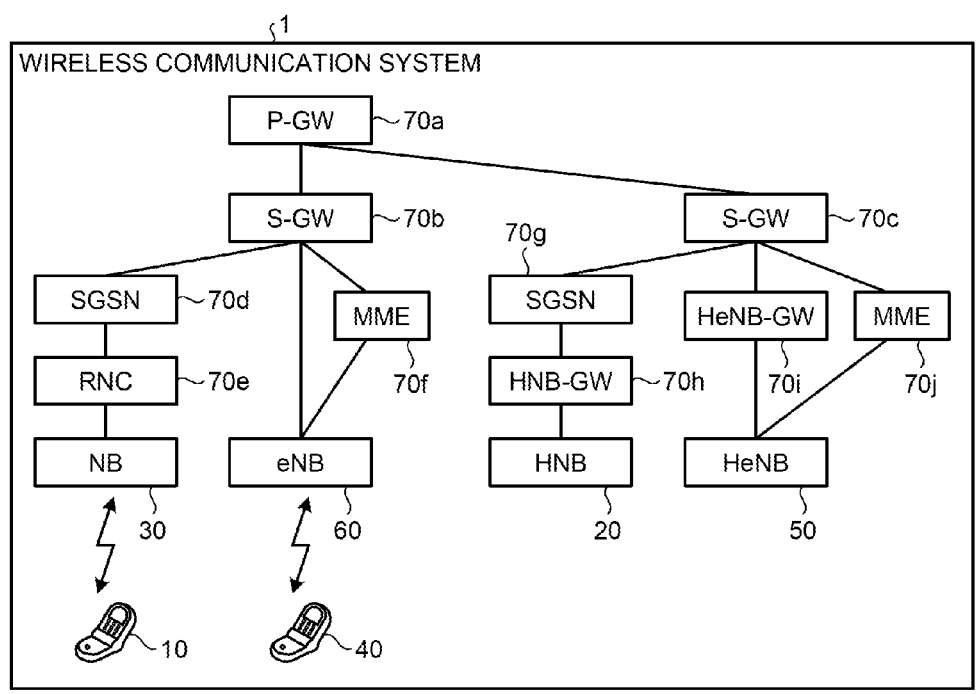
FIG. 1 is a schematic diagram illustrating an example configuration of a wireless communication system according to a first embodiment.

In the following, first, the configuration of a wireless communication system according to a first embodiment will be described. FIG. 1 is a schematic diagram illustrating an example configuration of a wireless communication system 1 according to a first embodiment. The wireless communication system 1 is a system in which W-CDMA and LTE are used as a wireless communication method. As illustrated in FIG. 1, the wireless communication system 1 includes at least a mobile station 10, a femto base station 20, and a macro base station 30, which will be described later. The mobile station 10 sends and receives various signals or data to and from the femto base station 20 (or a first base station, hereinafter, referred to as a femto base station) and the macro base station 30 (or a second base station, hereinafter, referred to as a macro base station). The word of macro used for the macro base station means the service area of the macro base station is large. The base station that covers the service area smaller than the macro base station is sometimes referred to as a micro base station and the base station that covers the service area further smaller than the micro base station is sometimes referred to as a pico base station. Furthermore, the femto base station means the service area of the femto base station is smaller than that covered by the macro base station, the micro base station, and the pico base station. Accordingly, the micro base station is sometimes referred to as a large scale base station or a large size base station. In contrast, the femto base station is sometimes referred to as a small size base station or a micro mini base station.

In the following, a specific example of the system configuration of the wireless communication system 1 will be described below. The wireless communication system 1 includes, on the mobile station side, the mobile station 10 and a mobile station 40 and includes, on the network side, the femto base station 20 functioning as a Home Node B (HNB), the macro base station 30 functioning as a Node B (NB), a femto base station 50 functioning as a Home e Node B (HeNB), and a macro base station 60 functioning as an e Node B (eNB). Furthermore, the wireless communication system 1 includes, as an upper-layer apparatus, on the network side, a P-GW 70a functioning as a Packet Data Network (PDN) gateway that forms a connection point with an external Internet Protocol (IP) service network. Furthermore, under the P-GW 70a, S-GWs 70b and 70c are connected as serving gateways. Furthermore, under the S-GW 70b, a serving GPRS support node (SGSN) 70d that manages member information (for example, connection destination information and authentication information) and a radio network controller (RNC) 70e functioning as a wireless control apparatus are connected. Furthermore, in addition to a direct connection channel, a channel passing through a Mobility Management Entity (MME) 70f that manages the moving, such as the setting of a connection, handover control, or the like, is formed between the S-GW 70b and the macro base station 60.

Furthermore, under the S-GW 70c, an SGSN 70g is connected to a Home Node B GateWay (HNB-GW) 70h that functions as a gateway for the femto base station 20. Furthermore, between the S-GW 70c and the femto base station 50, a HeNB-GW 70i functioning as a gateway for the femto base station 50 is connected, and, furthermore, as another channel, a channel passing through an MME 70j is formed. FIG. 1 illustrates the configuration in which the mobile station 10 is connected to the femto base station 20 via the P-GW 70a; however, the system may also be configured such that the mobile station 10 is connected to the femto base station 20 via the S-GWs 70b and 70c, instead of via the P-GW 70a.

Figure 2:
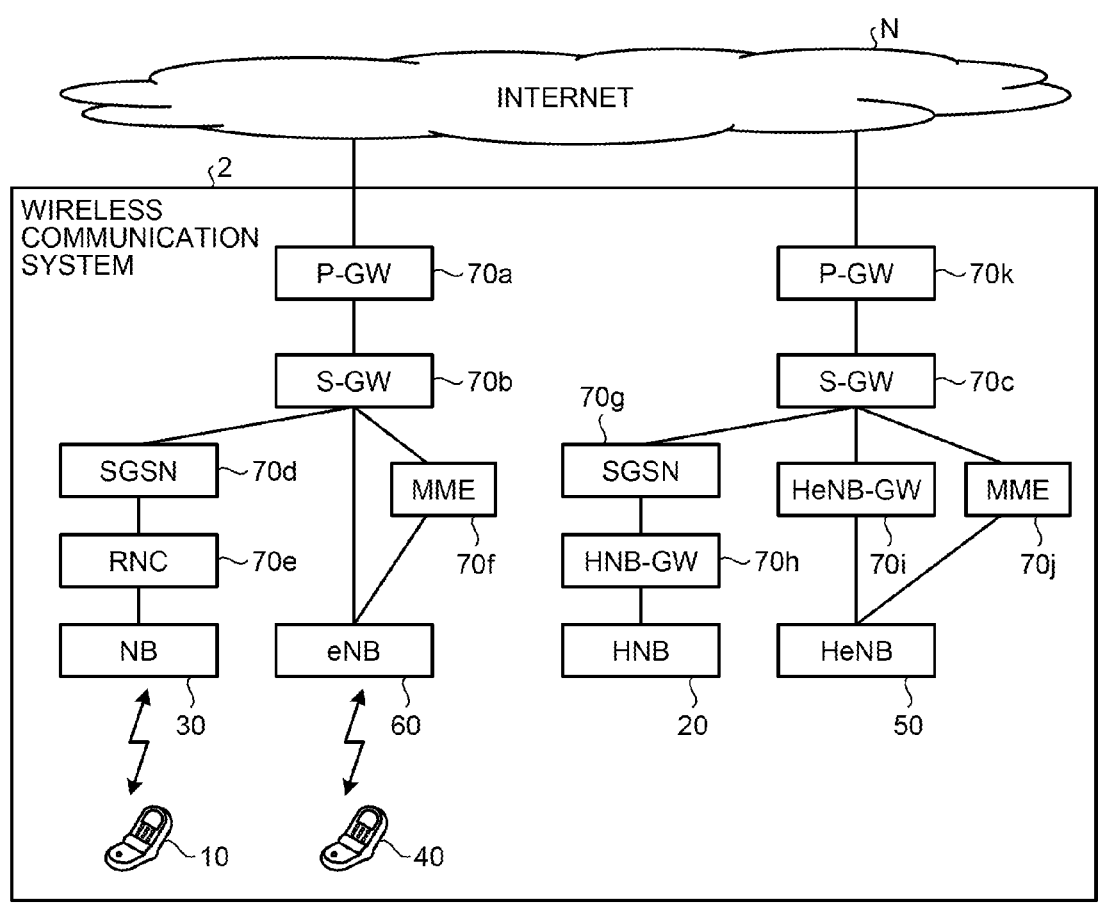
FIG. 2 is a schematic diagram illustrating another example configuration of the wireless communication system according to the first embodiment.

The configuration of the wireless communication system is not limited to the configuration illustrated in FIG. 1. The configuration illustrated in FIG. 2 may also be used. FIG. 2 is a schematic diagram illustrating another example configuration of the wireless communication system according to the first embodiment. The S-GWs 70b and 70c are not always need to be connected to the P-GW 70a as a single connection point. For example, as illustrated in FIG. 2, the P-GWs 70a and 70k that are the upper-layer apparatuses of the S-GWs 70b and 70c, respectively, may also be connected via a public network, such as the Internet N or the like.

Figure 3:
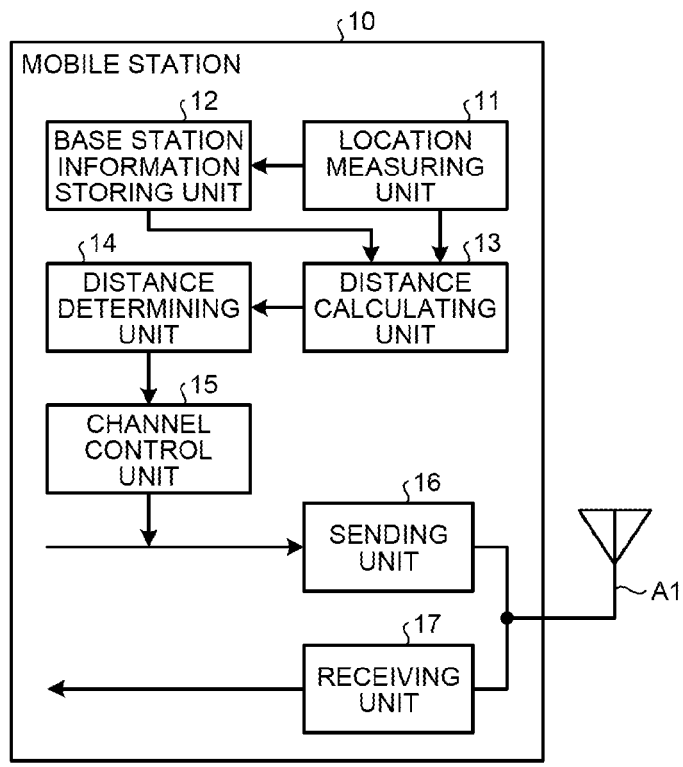
FIG. 3 is a schematic diagram illustrating an example of the functional configuration of a mobile station according to the first embodiment.

FIG. 3 is a schematic diagram illustrating an example of the functional configuration of the mobile station 10 according to the first embodiment. As illustrated in FIG. 3, the mobile station 10 includes, from a functional viewpoint, a location measuring unit 11, a base station information storing unit 12, a distance calculating unit 13, a distance determining unit 14, a channel control unit 15, a sending unit 16, and a receiving unit 17. Each of these units is connected such that a signal or data can be input and output in a one-way or two-way direction.

The location measuring unit 11 measures the location of the mobile station 10. The location measuring unit 11 may use the measurement results by using, for example, a location detection technology, i.e., an Assisted-Global Navigation Satellite System (A-GNSS), using the Global Positioning System (GPS) prescribed in $3^{rd}$ Generation Partnership Project (3GPP) specification. Alternatively, for the location measurement described above, for example, a measurement method, such as Observed Time Difference Of Arrival (OTDOA) that is similarly prescribed in the 3GPP specification and that uses a reception time difference, may also be used. Furthermore, the location measuring unit 11 may also perform measurement by using the technology of Enhanced Cell ID (E-CID) that is prescribed in the 3GPP specification and that specifies the location of the mobile station 10 based on the cell ID of the macro base station 30 or the femto base station 20.

The base station information storing unit 12 stores therein, for example, location information on the femto base station 20. The distance calculating unit 13 calculates the distance between the mobile station 10 and the femto base station 20 based on the location information on the mobile station 10 and the location information on the femto base station 20. The distance determining unit 14 compares the distance between the mobile station 10 and the femto base station 20 with a predetermined threshold $L_{th1}$ and outputs the comparison result to the channel control unit 15. The channel control unit 15 determines, based on the comparison result that is input from the distance determining unit 14, whether the channel from the macro base station 30 to the femto base station 20 needs to be set. If it is determined that the channel needs to be set, the channel control unit 15 generates a request signal that is used to request the setting of the channel. The sending unit 16 sends the channel setting request signal generated by the channel control unit 15 to the macro base station 30 via an antenna A1. The receiving unit 17 receives information, such as the location information on the femto base station 20 or the like, that is needed for channel control from the femto base station 20 via the antenna A1.

Figure 4:
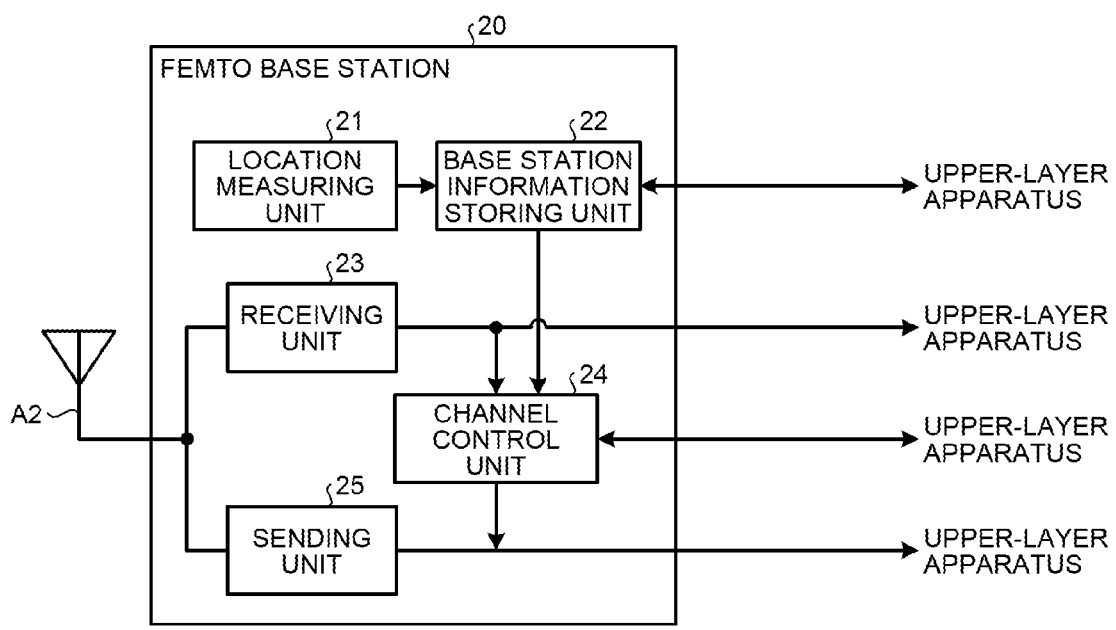
FIG. 4 is a schematic diagram illustrating an example of the functional configuration of a femto base station according to the first embodiment.

FIG. 4 is a schematic diagram illustrating an example of the functional configuration of the femto base station 20 according to the first embodiment. As illustrated in FIG. 4, the femto base station 20 includes, from a functional viewpoint, a location measuring unit 21, a base station information storing unit 22, a receiving unit 23, a channel control unit 24, and a sending unit 25. Each of these units is connected such that a signal or data can be input and output in a one-way or two-way direction. The location measuring unit 21 measures the location of the femto base station 20 by using the location detection function, such as GPS or the like. The location of the femto base station 20 may also be measured by the femto base station 20 itself or may also be obtained by the femto base station 20 from the location information that is measured by the mobile station 10 that is connected to the femto base station 20.

The base station information storing unit 22 stores therein the location information on, for example, the femto base station 20. The receiving unit 23 receives a notification signal that indicates a notification of the setting of the channel from the macro base station 30 to the femto base station 20. When the notification signal is received, the channel control unit 24 sets the channel from the femto base station 20 to the macro base station 30. The sending unit 25 sends the information needed for the channel control, such as the location information on the femto base station 20, to the mobile station 10 via the antenna A2.

Figure 5:
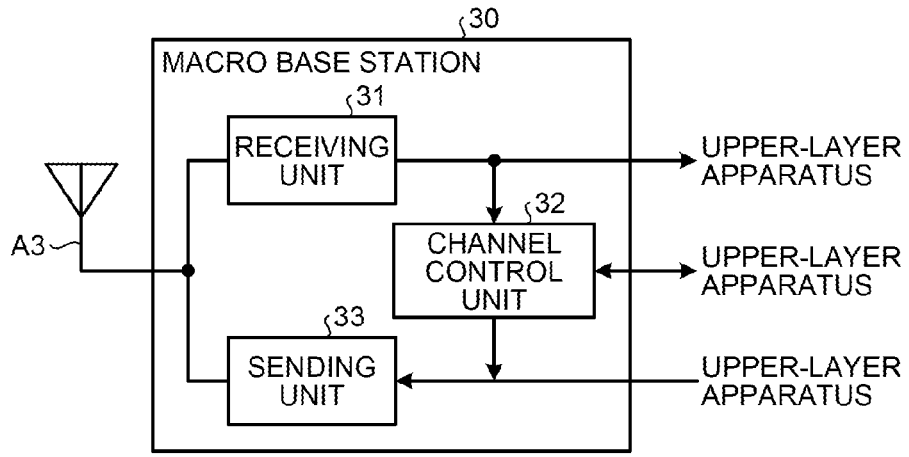
FIG. 5 is a schematic diagram illustrating an example of the functional configuration of a macro base station of the first embodiment.

FIG. 5 is a schematic diagram illustrating an example of the functional configuration of the macro base station 30 of the first embodiment. As illustrated in FIG. 5, the macro base station 30 includes a receiving unit 31, a channel control unit 32, and a sending unit 33. Each of these units is connected such that a signal or data can be input and output in a one-way or two-way direction. The receiving unit 31 receives a request signal for requesting the setting of the channel described above from the mobile station 10 via the antenna A3. When the channel control unit 32 detects that the request signal has been received, the channel control unit 32 sets the channel from the own station to the femto base station 20. The sending unit 33 sends, to the femto base station 20 by using the set channel, a notification signal that notifies the femto base station 20 of the setting of the channel.

Figure 6:
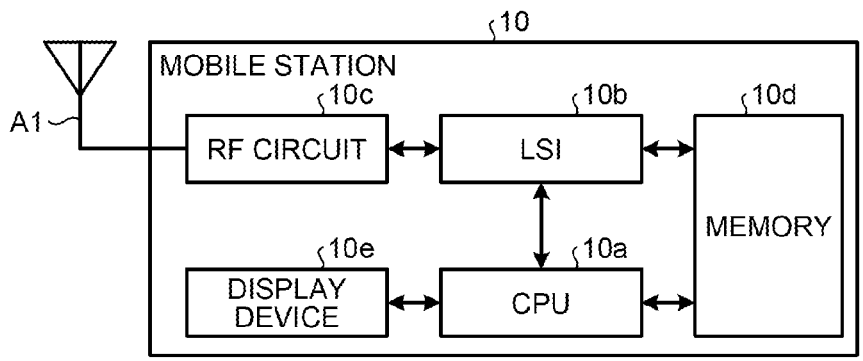
FIG. 6 is a schematic diagram illustrating an example of the hardware configuration of the mobile station.

The mobile station 10 is implemented by, for example, a smart phone. FIG. 6 is a schematic diagram illustrating an example of the hardware configuration of the mobile station 10. As illustrated in FIG. 6, the mobile station 10 includes, from a hardware standpoint, a central processing unit (CPU) 10a, a large scale integration (LSI) 10b, a radio frequency (RF) circuit 10c that includes the antenna A1, a memory 10d, and a display device 10e, such as a liquid crystal display (LCD) or the like. The memory 10d is, for example, a RAM, such as a synchronous dynamic random access memory (SDRAM) or the like, a read only memory (ROM), or a flash memory. The location measuring unit 11, the distance calculating unit 13, the distance determining unit 14, and the channel control unit 15 are implemented by the RF circuit 10c, the CPU 10a, or an integrated circuit, such as the LSI 10b or the like. The base station information storing unit 12 is implemented by the memory 10d. The sending unit 16 and the receiving unit 17 are implemented by the RF circuit 10c. Furthermore, a digital signal processor (DSP) may also be included in the LSI 10b.

Figure 7:
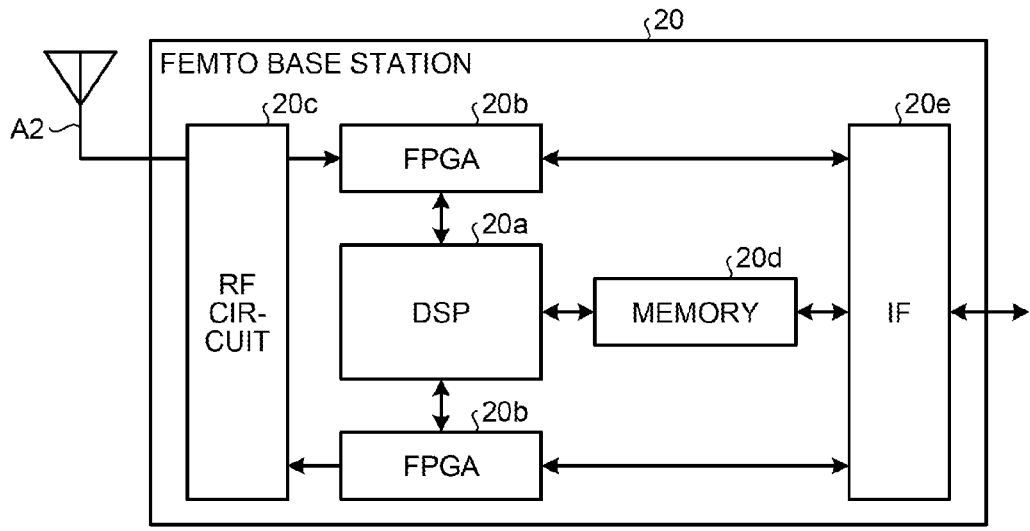
FIG. 7 is a schematic diagram illustrating an example of the hardware configuration of the base station.

FIG. 7 is a schematic diagram illustrating an example of the hardware configuration of the base station. As illustrated in FIG. 7, the femto base station 20 includes, as hardware components, a DSP 20a, a field programmable gate array (FPGA) 20b, an RF circuit 20c, a memory 20d, and an interface (IF) unit 20e. The DSP 20a and the FPGA 20b are connected such that various kinds of signals or data can be input or output via the IF unit 20e, such as a switch or the like. The RF circuit 20c includes an antenna A2 that is used to send and receive various kinds of signals or data. The memory 20d is, for example, a RAM, such as an SDRAM and the like, a ROM, or a flash memory. The location measuring unit 21 and the channel control unit 24 are implemented by the RF circuit 10c and the DSP 20a. Furthermore, the base station information storing unit 22 is implemented by the memory 20d. The receiving unit 23 and the sending unit 25 are implemented by the RF circuit 20c. Furthermore, instead of the FPGA 20b, an LSI device may also be used.

The macro base station 30 also has, from a hardware standpoint, the same configuration as that of the femto base station 20. Accordingly, the macro base station 30 is not illustrated and a description thereof will be omitted. The receiving unit 31 and the sending unit 33 are implemented by the RF circuit 20c, whereas the channel control unit 32 is implemented by the DSP 20a.

The main configuration of each of the mobile station 10, the femto base station 20, and the macro base station 30 has been described above. As for the other apparatuses, i.e., the mobile station 40, the femto base station 50, and the macro base station 60, have the same configuration of the mobile station 10, the femto base station 20, the macro base station 30, respectively, described above except for wireless communication that can be used. Accordingly, components having the same configuration are assigned the reference numerals with the same last numbers and descriptions of such components in detail are omitted.

Figure 8:
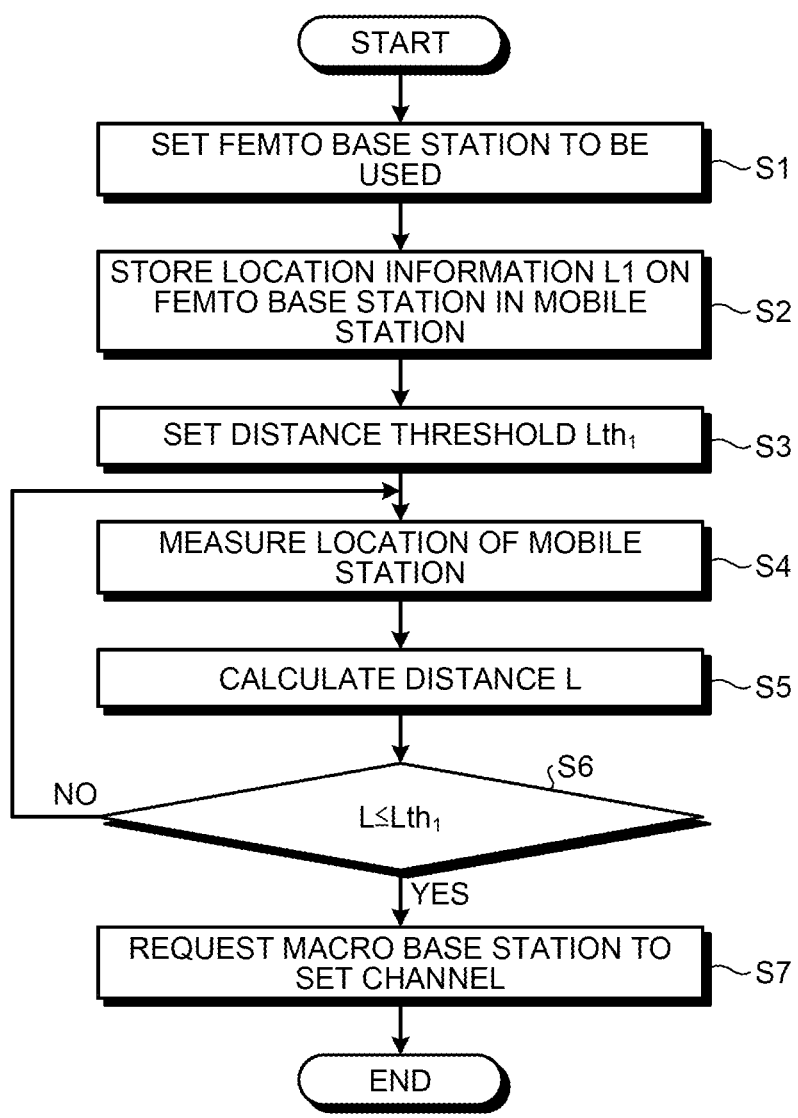
FIG. 8 is a flowchart illustrating an example of the flow of the operation of the wireless communication system according to the first embodiment.

In the following, an operation will be described. FIG. 8 is a flowchart illustrating an example of the flow of the operation of the wireless communication system 1 according to the first embodiment. First, at Step S1, a user of the mobile station 10 registers, in the mobile station 10, the femto base station 20 that is normally used by the user, thereby the base station information storing unit 12 stores therein information that is used to specify the femto base station 20 that is to be used. At this point, the information that is used to specify the femto base station 20 includes, in addition to the identification information on the base station itself, information that is used to identify whether the femto base station 20 is directly connected to the mobile telecommunications network to which the mobile station 10 belongs (the case illustrated in FIG. 1) or is connected to the network via the Internet (the case illustrated in FIG. 2).

Furthermore, the information that is used to specify the femto base station 20 described above may also include information that indicates whether a wireless communication system (for example, LTE) used by the femto base station 20 is the same wireless communication system (for example, W-CDMA) used by the mobile station 10. At this point, a case in which wireless communication systems are not the same is a case in which, of course, in addition to a case in which both wireless communication methods are not the same, even if both wireless communication methods are the same, telecommunications carriers differs. Furthermore, the information that is used to specify the femto base station 20 described above may also include the IP address (the global address or the local address) of the femto base station 20 or the designation (for example, the name of the apparatus registered in the domain name server (DNS)) of the femto base station 20.

In contrast, the femto base station 20 previously acquires, from the mobile station 10, the information that is used to specify a mobile station that has been permitted to connect and stores therein the information. Example of the information that is used to specify a mobile station includes a terminal number or a telephone number. Alternatively, information (for example, the international mobile subscriber identity (IMSI)) stored in a subscriber identity module (SIM) card may also be used.

At Step S2, the base station information storing unit 12 stores therein location information $L_1$ as information that indicates the location in which the femto base station 20 is installed. By doing so, the location of the femto base station 20 is previously registered in the mobile station 10. Furthermore, a distance threshold $L_{th1}$ is set in the base station information storing unit 12, which corresponds to the index for determining whether the mobile station 10 is located in the neighboring of the femto base station 20 (Step S3). At Step S4, the location measuring unit 11 in the mobile station 10 measures the current location of the mobile station 10 by using the measurement technology, such as GPS or the like, and stores the measured location as the location information $L_2$ on the mobile station 10 in the base station information storing unit 12.

A wired interface, such as a universal serial bus (USB) or the like, may be used for exchanging various kinds of information (for example, the identification information on the own station, the location information, and the closed subscriber group identifier (CSGID)) between the mobile station 10 and the femto base station 20. Furthermore, in addition to the wired interface, wireless communication, such as LTE, W-CDMA, WiMAX, WiFi, or the like, may also be used. Furthermore, Bluetooth (registered trademark) or near field communication (NFC), such as FeliCa, may also be used.

Furthermore, at Step S4, examples of the time at which, as a trigger, the mobile station 10 starts the location measurement includes the time at which a notification is sent from a base station to a mobile station, at predetermined time intervals previously determined by a mobile station or a base station, or the time at which an instruction is received from a user of the mobile station 10. The location measurement is performed in accordance with one of the above triggers and the obtained measurement result (location information) is sent to a base station.

At Step S5, by using the location information $L_1$ on the femto base station 20 stored at Step S2 and the location information $L_2$ on the mobile station 10 measured at Step S4, the distance calculating unit 13 in the mobile station 10 calculates the distance L between the mobile station 10 and the femto base station 20. Then, the distance determining unit 14 compares the magnitude relationship between the calculated distance L and the distance threshold $L_{th1}$ that is set at Step S3 (Step S6). If the comparison result satisfies the relationship represented by distance L≤ distance threshold $L_{th1}$ (Yes at Step S6), because the mobile station 10 is present in the neighboring of the femto base station 20, the channel control unit 15 determines that there is a high possibility that the mobile station 10 is handed over from the macro base station 30 to the femto base station 20. Accordingly, the channel control unit 15 requests the macro base station 30 via the sending unit 16 and the antenna A1 to set the channel from the macro base station 30 to the femto base station (Step S7). Namely, the channel control unit 15 generates a wireless channel setting request signal and sends the signal to the macro base station 30 that is being connected. Furthermore, at Step S6, if the relationship is represented by distance L> distance threshold $L_{th1}$ (No at Step S6), the process at Step S4 and the subsequent processes are performed again.

The setting of the channel mentioned here is a process of setting a channel that logically connects between, for example, the macro base station 30 to which the mobile station 10 is currently being connected and the femto base station 20 that is a new connection destination. With this process, data can be transmitted to the femto base station 20 that is specified by the macro base station 30. In the first embodiment, it is assumed that the transmission of information other than a control signal that is used to set a channel, for example, the transmission of user data from the macro base station 30 to the femto base station 20 via an upper-layer apparatus, is not performed until a handover is performed.

The macro base station 30 that has received the request described above, the macro base station 30 requests the upper-layer apparatus (for example, a gateway apparatus, a radio network controller (RNC), a mobility management entity (MME), or the like) to set a channel for the femto base station 20. The upper-layer apparatus that has received the request sets, in addition to the communication path to the macro base station 30 that is currently being used by the mobile station 10, a communication path to the femto base station 20. At this time, the transmission of the actual data does not always need to be transmitted.

Then, a handover is performed if the distance between the mobile station 10 and the femto base station 20 becomes a value equal to or less than the above described distance threshold $L_{th2}$ ($L_{th2}<L_{th1}$) or if the power received from the femto base station 20 in the mobile station 10 becomes greater than the power received from the macro base station 30. Consequently, the mobile station 10 is connected to the femto base station 20 as a new base station. Before the handover is performed, on the network side, because the communication path for the mobile station 10 has already been established, the time needed to perform the handover to the femto base station 20 is reduced. Consequently, the time needed to disconnect the channel can be reduced and thus a decrease in a transmission speed at the time of the handover can be suppressed. Consequently, high speed communication is available. Furthermore, instead of performing the handover, cell reselection (the reselecting of a base station) may also be performed or a different frequency handover may also be performed.

First Modification

Figure 9:
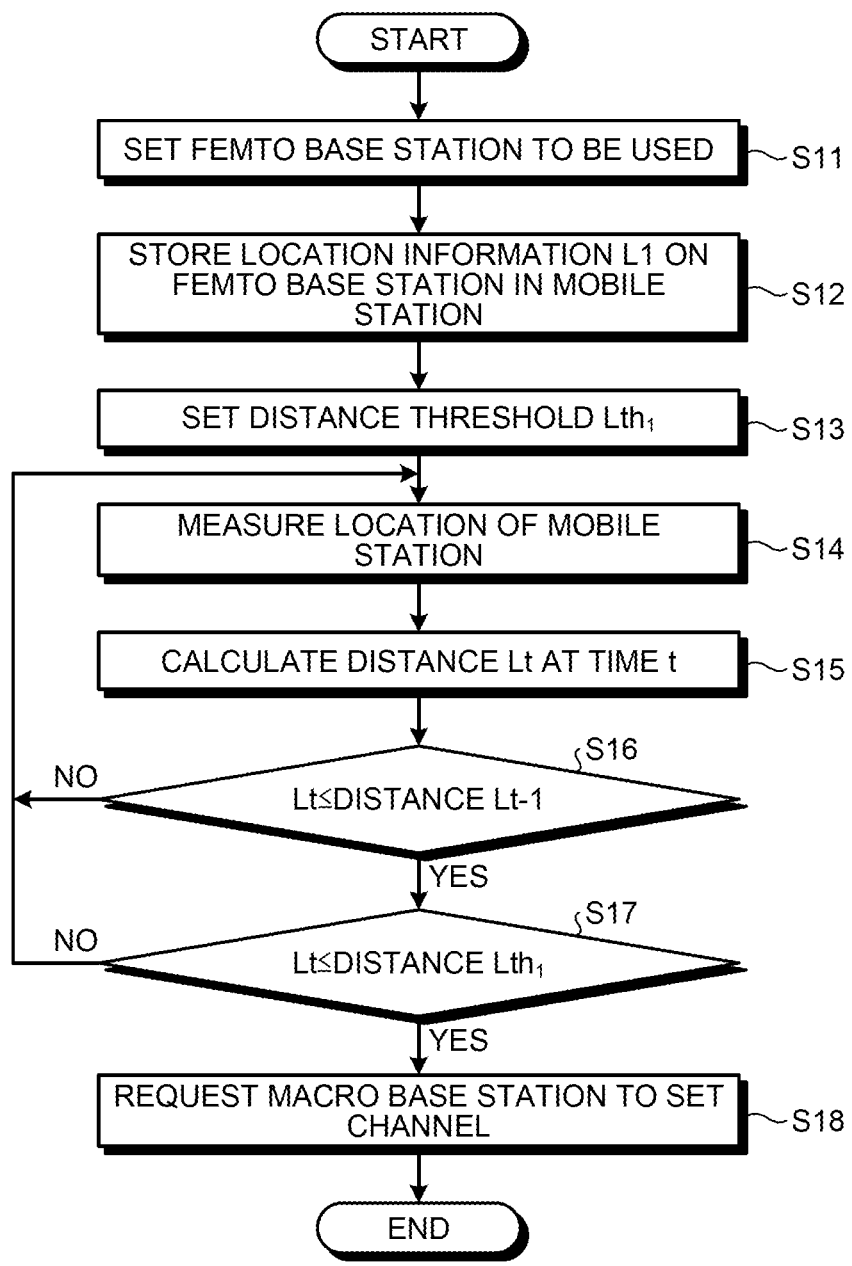
FIG. 9 is a flowchart illustrating an example of the flow of the operation of a wireless communication system according to a first modification of the first embodiment.

In the following, a first modification of the first embodiment will be described with reference to FIG. 9. The operation of the wireless communication system 1 according to the first modification will be described by mainly concentrating on the differences between the first embodiment and the first modification. FIG. 9 is a flowchart illustrating an example of the flow of the operation of the wireless communication system 1 according to a first modification of the first embodiment. Because FIG. 9 includes the same processes as those illustrated in FIG. 8 that are referred to in the description of the operation according to the first embodiment, processes performed at the same steps are assigned reference numerals with the same last numbers and descriptions of such processes in detail are omitted. Specifically, the processes performed at Steps S11 to S14, S17, and S18 illustrated in FIG. 9 correspond to the processes performed at Steps S1 to S4, S6, and S7 in FIG. 8, respectively.

At Step S15, by using the location information on the femto base station 20 stored at Step S12 and the location information on the mobile station 10 at time t measured at Step S4, the distance calculating unit 13 in the mobile station 10 calculates the distance $L_t$ between the mobile station 10 and the femto base station 20. Then, the distance determining unit 14 compares the magnitude relationship between the calculated distance $L_t$ and the distance $L_{t-1}$ at the time before a certain period of time (for example, one second to one minute) (Step S16). If the comparison result satisfies the relationship represented by distance $L_t \le$ distance $L_{t-1}$ (Yes at Step S16), the channel control unit 15 determines that the mobile station 10 approaches the femto base station 20 and then performs the process at Step S17 and the subsequent processes. Furthermore, at Step S16, if the relationship is represented by distance $L_t>$ distance $L_{t-1}$ (No Step S16), the process returns to Step S14 and the process at Step S14 and the subsequent processes are performed again.

In any of the cases described above, the channel setting distance threshold $L_{th}$ is set before the channel is set. In the system in which the mobile station 10 is connected to the femto base station 20 via the Internet (see FIG. 2), the distance threshold $L_{th}$ that is longer than that used in the system that is connected to a system in which the same wireless communication systems (intranet) are used (see FIG. 1) is set. Namely, the setting is preferably made such that the relationship is represented by "the channel setting distance threshold $L_{th1}$ in the Intranet<the channel setting distance threshold $L_{th3}$ in the Internet". The reason for this is that the path connected to the femto base station 20 via the Internet is longer than the path connected to the femto base station 20 in the intranet and the number of apparatuses passing toward the femto base station 20 is great. Consequently, the time needed to establish the path and set the channel between the apparatuses is longer than that connected via the intranet. Accordingly, by setting a longer distance threshold $L_{th3}$, the wireless communication system 1 can start to set a channel in the early stage, thereby ensuring longer time that can be used for setting the channel. By doing so, when a handover of the mobile station 10 is performed, a channel is reliably set regardless of the system configuration.

Accordingly, the wireless communication system 1 can perform the adjustment such that, if the difference between the time needed to set the channel connected to an intranet and the time needed to set the channel connected to the Internet is small, the difference between the distance threshold $L_{th1}$ and the distance threshold $L_{th3}$ is made to small, whereas, in the reverse case, the difference between the distance thresholds is made large. Furthermore, as described above, the mobile station 10 includes, as one of the pieces of information for specifying the femto base station 20, information that is used to identify whether the femto base station 20 is connected via the Internet. Accordingly, in accordance with the pieces of the information, the mobile station 10 can cope with setting an optimum distance threshold to be used or appropriately selecting the distance threshold. Consequently, the flexibility of the wireless communication system 1 is improved. Furthermore, the determination whether the femto base station 20 is connected via the Internet may also be performed based on whether the IP address of the femto base station 20 is a global address or a local address (a private address).

In the first embodiment, a description has been given with the assumption that the mobile station 10 is being connected to the macro base station 30; however, the configuration is not limited thereto. The wireless communication system 1 according to the first embodiment may also be used even if the mobile station 10 is in a waiting state in a cell of the selected macro base station 30. However, with this configuration, the mobile station 10 sets a normal wireless channel that is used for a random access and then notifies the macro base station 30 that the mobile station 10 requests the femto base station 20 to set the channel. Furthermore, the same applied to a case in which a mobile station is being connected to a micro base station or a pico base station. In a description below, it is assumed that the first embodiment described above and embodiments that will be described below can be used for a micro base station or a pico base station unless otherwise noted. Furthermore, it is assumed that a femto base station, a macro base station, and a pico base station are small size base stations and are also be applicable to the embodiments.

[b] Second Embodiment

In the following, a second embodiment will be described. The configuration of a wireless communication system according to the second embodiment is the same as that of the wireless communication system according to the first embodiment illustrated in FIG. 1. Furthermore, the configuration of each of a mobile station, a femto base station, and a macro base station according to the second embodiment is the same as that of the mobile station 10, the femto base station 20, and the macro base station 30, respectively, according to the first embodiment. Accordingly, in the second embodiment, components having the same configuration as those in the first embodiment are assigned the same reference numerals and descriptions of such components in detail are omitted. The second embodiment differs from the first embodiment in that the content of channel control that is requested by the mobile station 10 to the macro base station 30 differs. Specifically, in the first embodiment, when the mobile station 10 approaches within a predetermined distance from the femto base station 20, the mobile station 10 requests the macro base station 30 to set an additional channel. In contrast, in the second embodiment, when the mobile station 10 moves away from the femto base station 20 by the distance equal to or greater than the predetermined distance, the mobile station 10 requests the macro base station 30 to delete the set channel.

Figure 10:
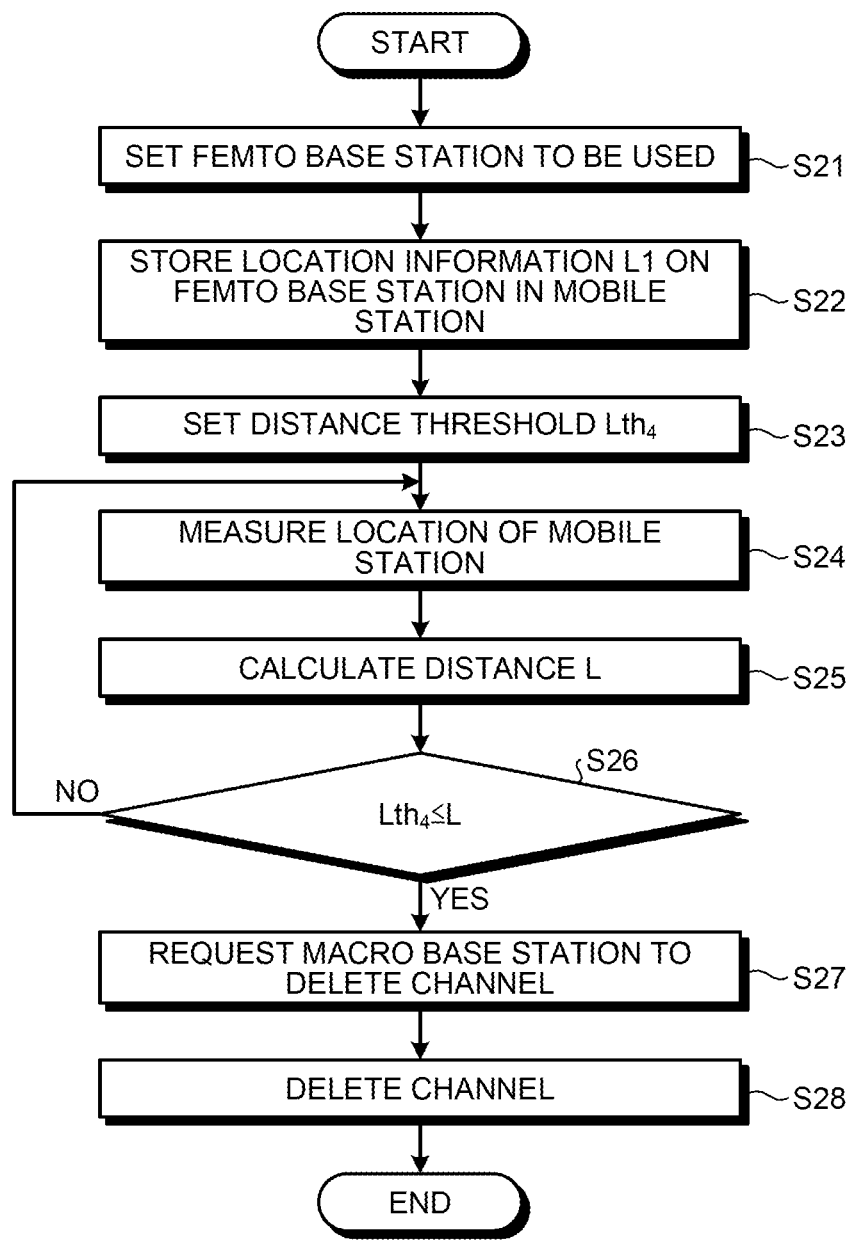
FIG. 10 is a flowchart illustrating an example of the flow of the operation of a wireless communication system according to a second embodiment.

In the following, the operation of the wireless communication system 1 according to the second embodiment will be described by mainly concentrating on the difference between the first embodiment and the second embodiment. FIG. 10 is a flowchart illustrating an example of the flow of the operation of the wireless communication system 1 according to a second embodiment. Because FIG. 10 illustrates the same processes as those illustrated in FIG. 8 that are referred to in the description of the operation according to the first embodiment, processes performed at the same steps are assigned reference numerals with the same last numbers and descriptions of such processes in detail are omitted. Specifically, the processes performed at Steps S21 to S25 illustrated in FIG. 10 correspond to the processes performed at Steps S1 to S5 illustrated in FIG. 8, respectively.

At Step S26, the distance determining unit 14 in the mobile station 10 compares the magnitude relationship between the distance L calculated at Step S25 and the distance threshold $L_{th4}$ that is set at Step S23 (Step S26). If the comparison result satisfies the relationship represented by distance threshold $L_{th4} \leq$ distance L (Yes at Step S26), because the mobile station 10 is not present in the neighboring of the femto base station 20, the channel control unit 15 determines that there is a high possibility that the mobile station 10 ends the connection to the femto base station 20. Accordingly, the channel control unit 15 requests the macro base station 30 via the sending unit 16 and the antenna A1 to delete the channel that is set between the macro base station 30 and the femto base station 20 (Step S27). Namely, the channel control unit 15 generates a wireless channel deletion request signal and sends the signal to the macro base station 30. The channel control unit 32 in the macro base station 30 deletes, in accordance with the deletion request signal described above, the channel that is set between the femto base station 20 (Step S28). Furthermore, at Step S26, if the relationship is represented by distance threshold $L_{th4}>$ distance L (No at Step S26), the process at Step S24 and the subsequent processes are performed again.

The macro base station 30 that has received the request described above releases (deletes) the channel that is set between the macro base station 30 and the femto base station 20 and also instructs the upper-layer apparatus to release the channel. Consequently, the wireless communication system 1 can promptly and reliably release the channel that is not needed any more due to the separation of the mobile station 10 and can allocate the channel to the other mobile station. Thus, the system resources can be efficiently used.

[c] Third Embodiment

In the following, a third embodiment will be described. The configuration of a wireless communication system according to the third embodiment is the same as that of the wireless communication system according to the first embodiment illustrated in FIG. 1. Furthermore, the configuration of each of a mobile station, a femto base station, and a macro base station according to the third embodiment is the same as that of the mobile station 10, the femto base station 20, and the macro base station 30, respectively, according to the first embodiment. Accordingly, in the third embodiment, components having the same configuration as those in the first embodiment are assigned the same reference numerals and descriptions of such components in detail are omitted. The third embodiment differs from the first embodiment in that the distance determination performed by comparing the distance between the mobile station 10 and the femto base station 20 with the threshold $L_{th1}$ is performed by the macro base station 30. Specifically, in the first embodiment, the distance determining unit 14 in the mobile station 10 performs the distance determination and provides the result of the determination to the macro base station 30. In contrast, in the third embodiment, the mobile station 10 does not compare the distance with the threshold. Instead of this, a distance determining unit 37 in the macro base station 30 performs the distance determination by comparing the distance between the mobile station 10 and the femto base station 20 with the threshold $L_{th1}$.

Figure 11:
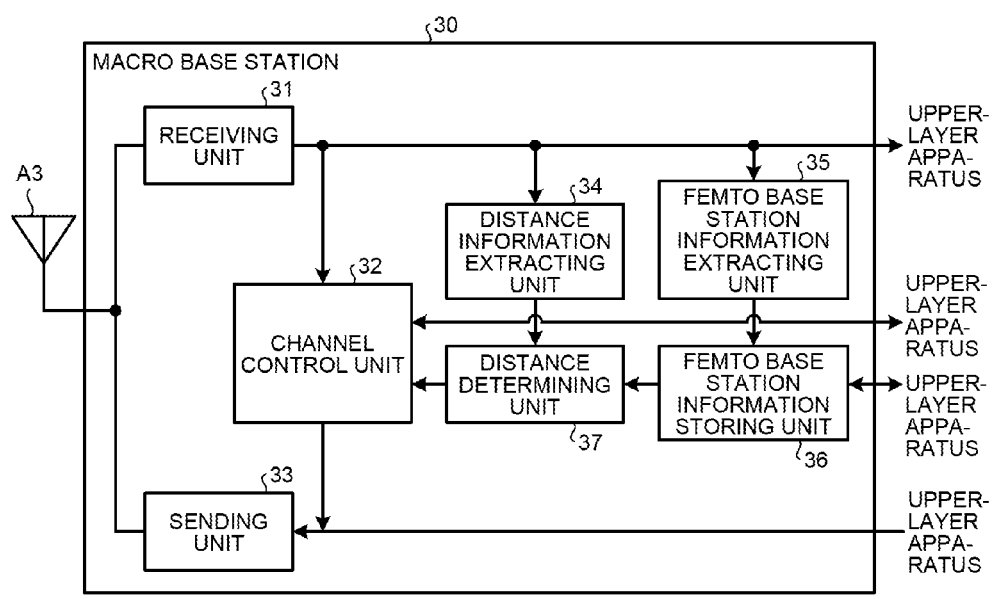
FIG. 11 is a schematic diagram illustrating an example of the functional configuration of a macro base station according to the third embodiment.

FIG. 11 is a schematic diagram illustrating an example of the functional configuration of the macro base station 30 according to the third embodiment. As illustrated in FIG. 11, the configuration of the macro base station 30 is the same as that illustrated in FIG. 5 except that a distance information extracting unit 34, a femto base station information extracting unit 35, a femto base station information storing unit 36, and the distance determining unit 37 are included. Accordingly, components having the same configuration as those in the first embodiment are assigned the same reference numerals and descriptions of such components in detail are omitted. The distance information extracting unit 34 extracts, from the information received from the mobile station 10, the distance information on the distance between the mobile station 10 and the femto base station 20. Then, the distance determining unit 37 determines, based on the distance information, whether the channel between the macro base station 30 and the femto base station 20 is needed. Furthermore, by using the location information that is extracted from the femto base station information extracting unit 35 and that is stored in the femto base station information storing unit 36 and by using the location information on the mobile station 10, the macro base station 30 calculates the distance by itself. In any methods described above, the wireless communication system 1 can reduce the processing load applied on a mobile station due to determining or calculating the distance and can shorten the processing time.

The time needed to perform a handover varies depending on a communication environment or a communication status. The time needed for a handover is determined depending on, for example, the type of networks, such as an intranet, the Internet, the ATM, a public network, a dedicated network, or the like, or depending whether a handover is performed between the same networks or between different networks. Furthermore, the time needed for a handover is determined depending on the type of addresses, such as a local address or a global address, or depending on whether a handover is performed between the same telecommunications carriers or between different telecommunications carriers. Alternatively, the time needed for a handover also depends on the wireless communication methods. Consequently, in order to implement efficient channel control neither too much nor too little, the distance threshold $L_{th}$ that is used to determine when, as a trigger, the channel control is started is preferably set such that the distance threshold $L_{th}$ is variable and can be updated in accordance with the determination of the time.

For example, if the mobile station 10 is handed over between networks in which the type of the networks, the type of the addresses, and the telecommunication carriers differ, it is preferable to set the distance threshold $L_{th}$ greater than that used when a handover is performed between, for example, networks provided by the same telecommunications carriers but only the type of networks differs. Reliably performing needed preparation while avoiding unwanted control related to a handover is effective from the viewpoint of performing a smooth handover. By performing the setting in accordance with the communication environment described above, the wireless communication system 1 can detect the possibility of a handover of the mobile station 10 in further early stages even if the time needed to perform a handover becomes longer. In contrast, if the time needed to perform a handover is small, because the wireless communication system 1 starts the channel control when the possibility of handover becomes high, i.e., when the mobile station 10 further approaches the femto base station 20, the wireless communication system 1 can perform effective control without waste. Consequently, it is possible to implement flexible and detailed channel control. In the following, a specific description will be given with reference to FIGS. 12 to 15.

Second Modification

Figure 12:
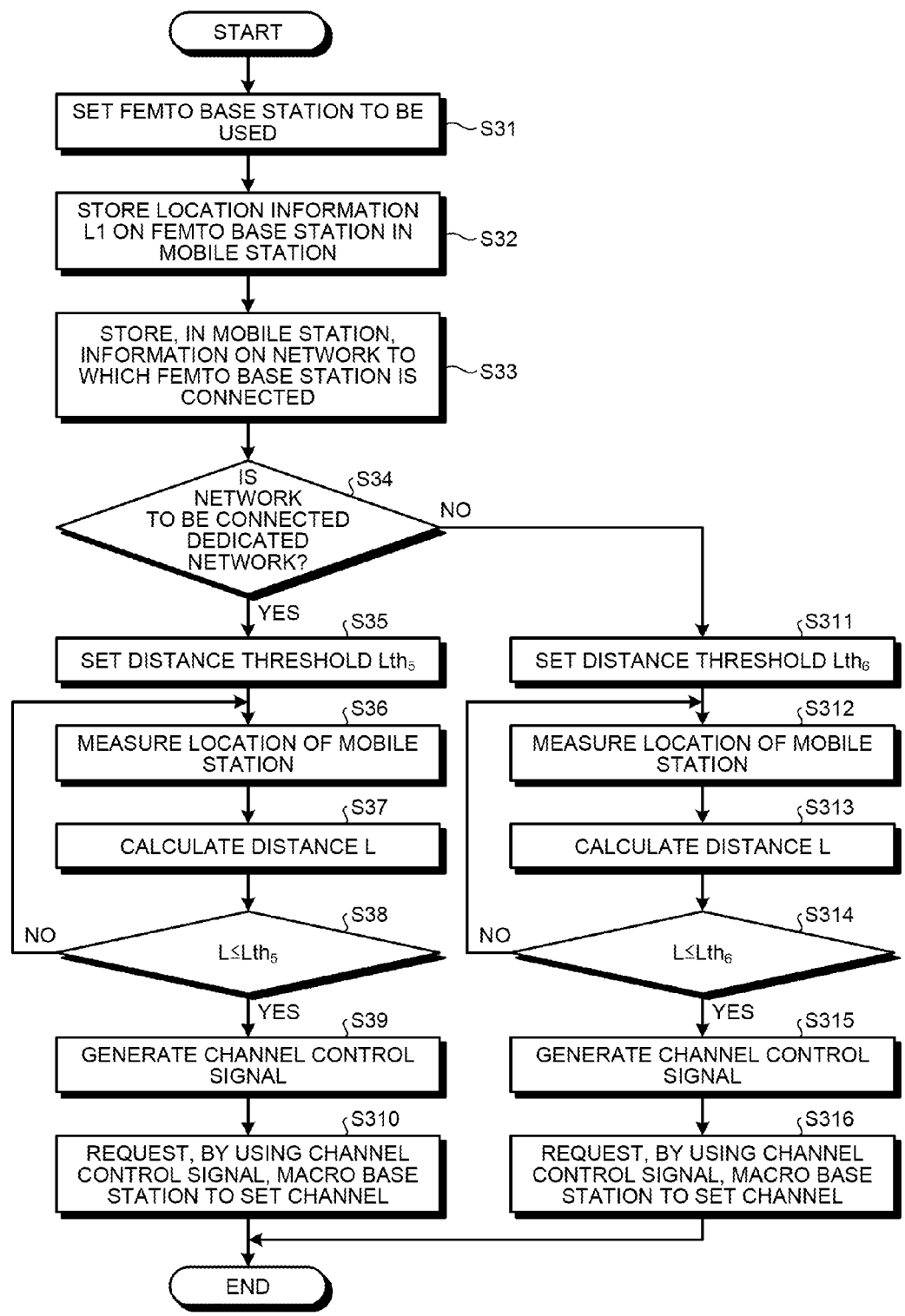
FIG. 12 is a flowchart illustrating an example of the flow of the operation of a wireless communication system according to a second modification of the first and the third embodiments.

FIG. 12 is a flowchart illustrating an example of the flow of the operation of the wireless communication system 1 according to a second modification of the first and the third embodiments. The main operation illustrated in FIG. 12 is the same as that illustrated in FIG. 8; therefore, a description thereof in detail will be omitted. As illustrated in FIG. 12, for example, when the network to which the femto base station 20 is connected is a dedicated network, it is assumed that the time needed for a handover is shorter than the time needed for a handover when the femto base station 20 is connected to a network that is not the dedicated network, i.e., connected to, for example, a public network, such as the Internet or the like. Consequently, the wireless communication system 1 uses the distance threshold $L_{th5}$ that is smaller than the distance threshold $L_{th}$ that is used when the dedicated network is used for the femto base station 20. In contrast, when the network to which the femto base station 20 is connected is not the dedicated network, data transfer due to a handover is performed by passing a large number of apparatuses. Consequently, it is assumed that a long time is needed to complete the handover. Thus, by using the distance threshold $L_{th6}$ having a value greater than that of the distance threshold $L_{th5}$, the wireless communication system 1 lengthen the time period for which the channel is established when compared with a case in which the femto base station 20 is connected to the dedicated network.

Third Modification

Figure 13:
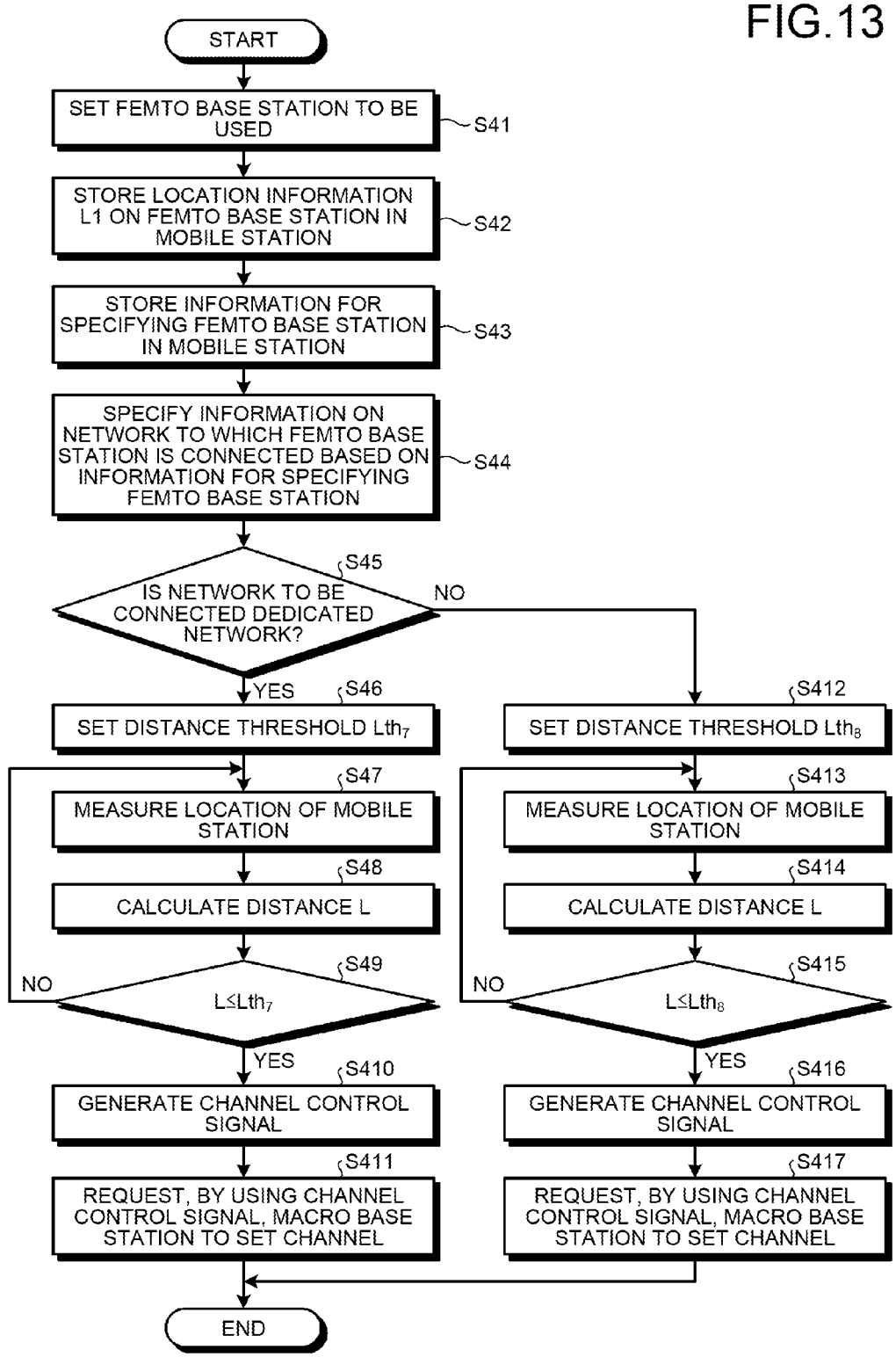
FIG. 13 is a flowchart illustrating an example of the flow of the operation of a wireless communication system according to a third modification of the first and the third embodiments.

In the following, the operation of the wireless communication system 1 according to a third modification of the first and the third embodiments will be described by mainly concentrating on the difference between the second modification and the third modification. FIG. 13 is a flowchart illustrating an example of the flow of the operation of the wireless communication system 1 according to the third modification of the first and the third embodiments. Because FIG. 13 illustrates the same processes as those illustrated in FIG. 12 that are referred to in the description of the operation according to the second embodiment, processes performed at the same steps are assigned reference numerals with the same last numbers and descriptions of such processes in detail are omitted. Specifically, the processes performed at Steps S41, S42, and S44 to S417 illustrated in FIG. 13 correspond to the processes performed at Steps S31, S32, and S33 to S316 illustrated in FIG. 12, respectively. At Step S43, the mobile station 10 stores information (for example, identification information) that is used to specify the femto base station 20 in the base station information storing unit 12. At Step S44, based on the information stored at Step S43, the mobile station 10 specifies the information (for example, the type of networks or a carrier name) on the network currently connected by the femto base station 20 and stores the information in the base station information storing unit 12.

Fourth Modification

Figure 14:
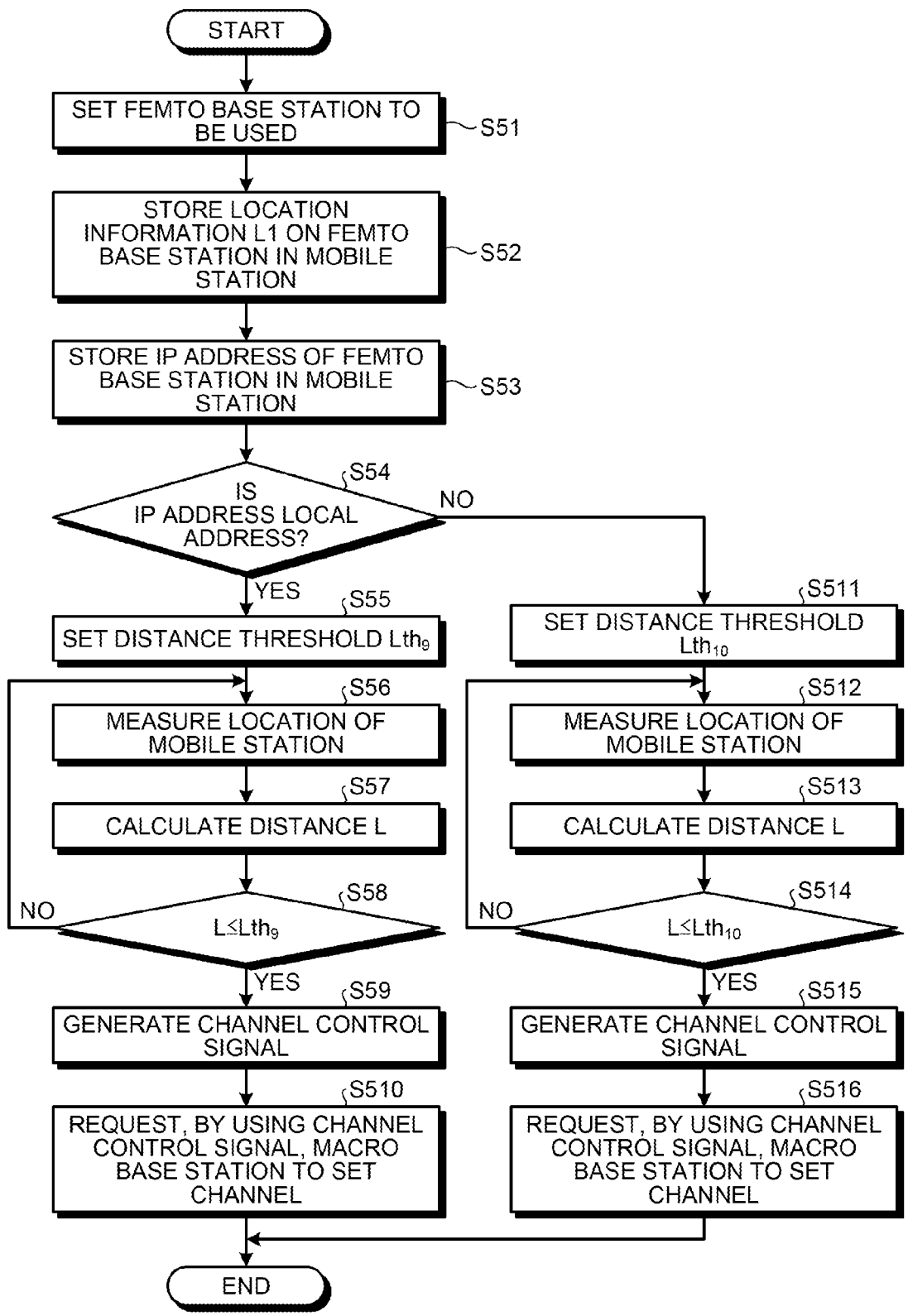
FIG. 14 is a flowchart illustrating an example of the flow of the operation of a wireless communication system according to a fourth modification of the first and the third embodiments.

FIG. 14 is a flowchart illustrating an example of the flow of the operation of the wireless communication system 1 according to a fourth modification of the first and the third embodiments. As illustrated in FIG. 14, for example, if the IP address allocated to the femto base station 20 is a local address, there is a high possibility that the femto base station 20 is installed in the same network as that of the macro base station 30. Consequently, an assumption that a handover will be completed in a relatively short time is established. Accordingly, the wireless communication system 1 uses, as the distance threshold $L_{th}$, the distance threshold $L_{th9}$ that is a smaller threshold. In contrast, if the IP address allocated to the femto base station 20 is a global address, there is a high possibility that the femto base station 20 is installed in a network that is different from the network to which the macro base station 30 is connected. Consequently, it is assumed that the time needed for the mobile station 10 to complete a handover is long. Thus, by using the distance threshold $L_{th10}$ having a greater value than that of the distance threshold $L_{th9}$, the wireless communication system 1 ensures a longer time that can be used to set the channel from the macro base station 30 to the femto base station 20.

Fifth Modification

Figure 15:
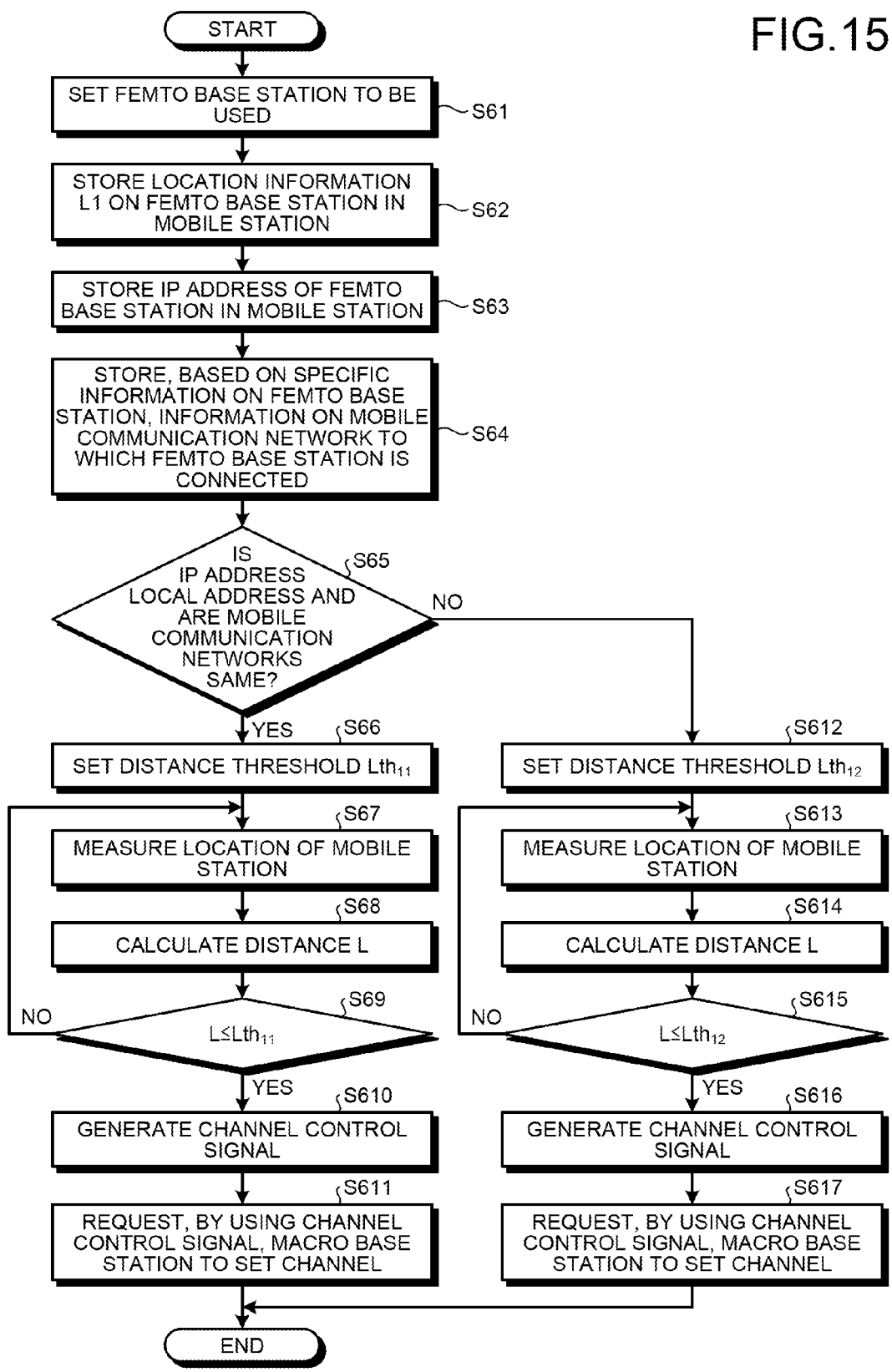
FIG. 15 is a flowchart illustrating an example of the flow of the operation of a wireless communication system according to a fifth modification of the first and the third embodiments.

FIG. 15 is a flowchart illustrating an example of the flow of the operation of the wireless communication system 1 according to a fifth modification of the first and the third embodiments. The main operation illustrated in FIG. 15 is the same as that illustrated in FIG. 13; therefore, a description in detail will be omitted. As illustrated in FIG. 15, for example, if the IP address of the femto base station 20 is a local address and if the femto base station 20 and the macro base station 30 are connected to the same mobile communication network, it is assumed that the time needed for a handover is relatively short. Consequently, the wireless communication system 1 uses the distance threshold $L_{th11}$ as the distance threshold $L_{th}$. In contrast, if a state satisfies the condition in which the IP address of the femto base station 20 is a global address or the condition in which the femto base station 20 and the macro base station 30 are connected between different mobile communication networks or a combination thereof, a large number of apparatuses are used for a handover. Consequently, it is assumed that the time needed for a handover is long. Thus, by using the distance threshold $L_{th12}$ ($L_{th12}>L_{th11}$), the wireless communication system 1 ensures a longer time that can be used to establish the channel. Furthermore, in the fifth modification, even when the IP address described above is a local address and the base stations, i.e. the femto base station 20 and the macro base station 30, are connected to the same network, if the telecommunications carrier differs between the femto base station 20 and the macro base station 30, the same effect (a reduction in handover time) as that in the other second to the fourth modifications can be obtained from the channel control performed by the wireless communication system 1.

In the second to the fifth modifications, the wireless communication system 1 sets two kinds of distance thresholds depending on the length of the predicted handover time; however, the distance threshold to be set is not limited to two kinds. For example, from among the modifications, two or more modifications may also be combined and the mobile station 10 may also use further kinds of thresholds, for example, three or more kinds of thresholds. Consequently, it is possible to implement further flexible and detailed channel control.

Sixth Modification

The wireless communication system 1 may also use the channel release technology, which has been described above in the second embodiment, with respect to the third embodiment described above. Specifically, in addition to setting a channel, when the channel is released, instead of performing the channel control, the macro base station 30 determines, by itself in accordance with the request from the mobile station 10, whether the channel needs to be released based on the distance acquired from the mobile station 10. Furthermore, by using the location information on the mobile station 10 and the location information on the femto base station 20, the macro base station 30 may also calculate, by itself, the distance. In such a case, the location information on the femto base station 20 may also be acquired from the femto base station 20 or may also be acquired via the mobile station 10. With this method, it is also possible to obtain the same effect as that in the first to the third embodiments, i.e., it is possible to improve the transmission quality by maintaining a transmission speed due to a reduction of the handover time.

[d] Fourth Embodiment

In the following, a fourth embodiment will be described. The configuration of a wireless communication system according to the fourth embodiment is the same as that of the wireless communication system according to the first embodiment illustrated in FIG. 1. Furthermore, the configuration of each of a mobile station, a femto base station, and a macro base station according to the third embodiment is the same as that of the mobile station 10, the femto base station 20, and the macro base station 30, respectively, according to the first embodiment. Accordingly, in the fourth embodiment, components having the same configuration as those in the first embodiment are assigned the same reference numerals and descriptions of such components in detail are omitted. The fourth embodiment differs from the first embodiment in that, after a channel is set, the femto base station 20 is operated or changes into a normal operation mode. Namely, in the first embodiment, a channel is previously set between the macro base station 30 and the femto base station 20. However, in the fourth embodiment, in addition to this, operation control is performed on the femto base station 20.

Figure 16:
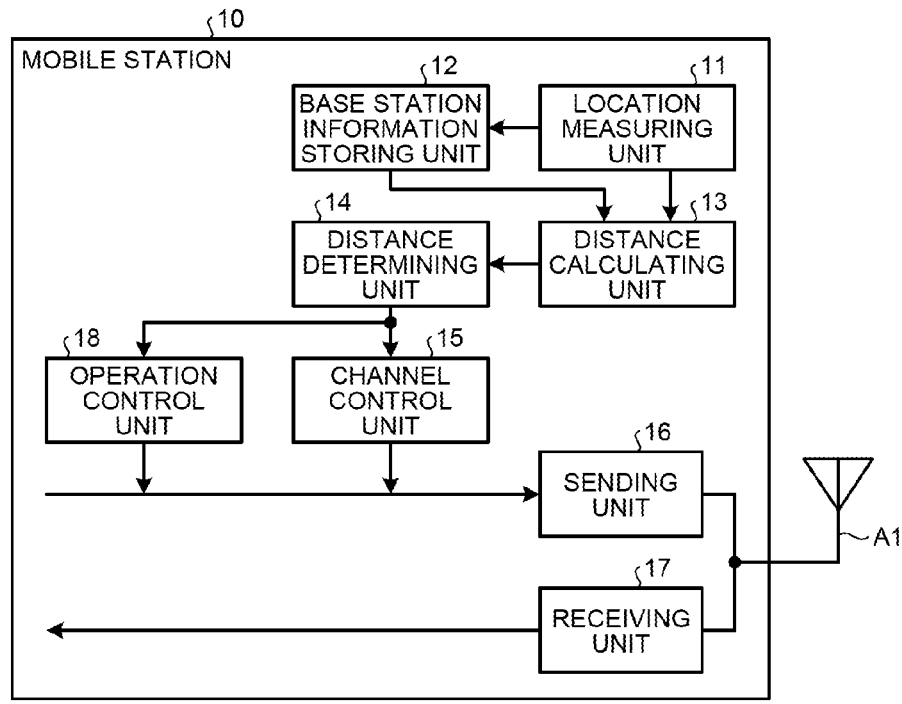
FIG. 16 is a schematic diagram illustrating an example of the functional configuration of a mobile station of a fourth embodiment.

FIG. 16 is a schematic diagram illustrating an example of the functional configuration of the mobile station 10 of a fourth embodiment. As illustrated in FIG. 16, the configuration of the mobile station 10 is the same as that illustrated in FIG. 3 except that an operation control unit 18 is included. Accordingly, components having the same configuration are assigned the same reference numerals and descriptions of such components in detail are omitted. The operation control unit 18 determines, based on the comparison result input from the distance determining unit 14, whether the operation control with respect to the femto base station 20 is needed. If it is determined that the operation control is needed, the operation control unit 18 generates a request signal for requesting the operation control.

Figure 17:
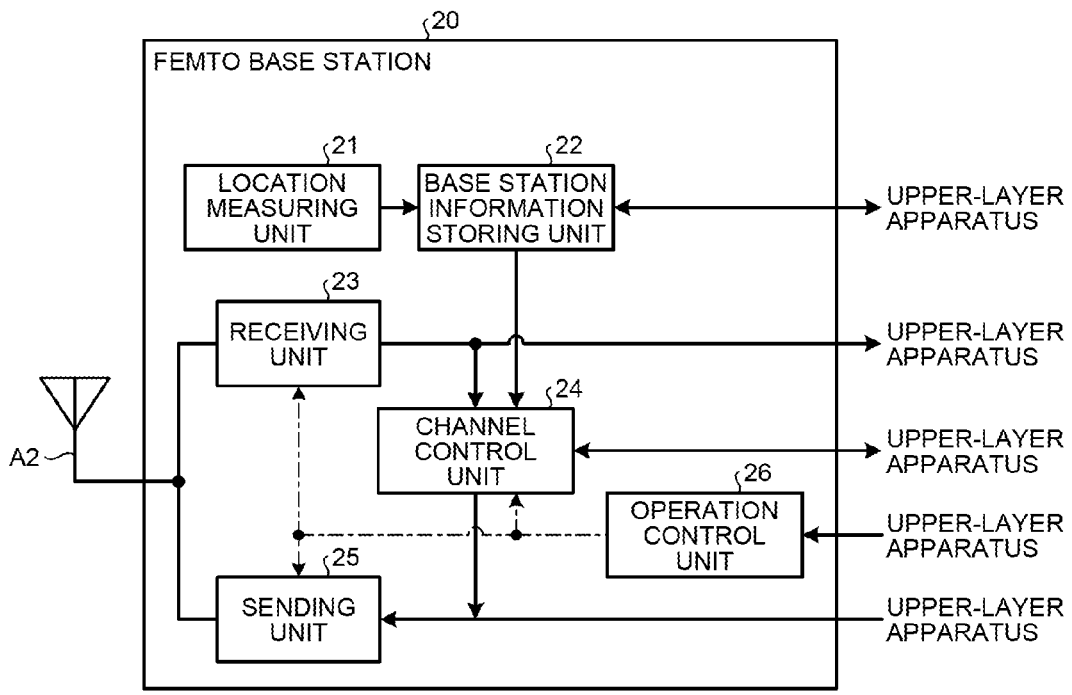
FIG. 17 is a schematic diagram illustrating an example of the functional configuration of a femto base station according to the fourth embodiment.

FIG. 17 is a schematic diagram illustrating an example of the functional configuration of the femto base station 20 according to the fourth embodiment. As illustrated in FIG. 17, the configuration of the femto base station 20 is the same as that illustrated in FIG. 4 except that an operation control unit 26 is included. Accordingly, components having the same configuration are assigned the same reference numerals and descriptions of such components in detail are omitted. If an operation control signal is received from the macro base station 30, the operation control unit 26 performs the operation control with respect to the femto base station 20. For example, if the femto base station 20 is stopped, the operation control unit 26 controls the femto base station 20 such that the femto base station 20 is operated. If the operation mode of the femto base station 20 is in an intermittent operation mode (an electrical power saving mode), the operation control unit 26 controls such that the femto base station 20 changes into a normal operation mode.

Figure 18:
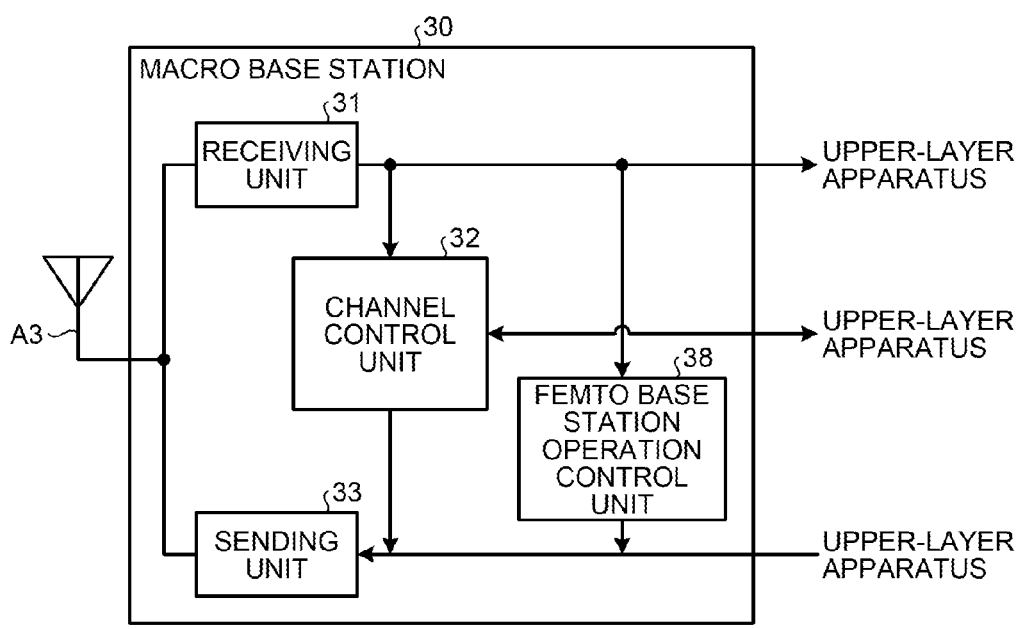
FIG. 18 is a schematic diagram illustrating an example of the functional configuration of a macro base station according to the fourth embodiment.

FIG. 18 is a schematic diagram illustrating an example of the functional configuration of the macro base station 30 according to the fourth embodiment. As illustrated in FIG. 18, the configuration of the femto base station 20 is the same as that of the macro base station 30 illustrated in FIG. 5 except that a femto base station operation control unit 38 is included. Accordingly, components having the same configuration are assigned the same reference numerals and descriptions of such components in detail are omitted. When the femto base station operation control unit 38 detects that the request signal described above has been received, the femto base station operation control unit 38 generates an operation control signal that is used to instruct the femto base station 20 to operate or that is used to change the operation mode into the normal operation mode and sends the generated operation control signal to the femto base station 20 via the sending unit 33.

Figure 19:
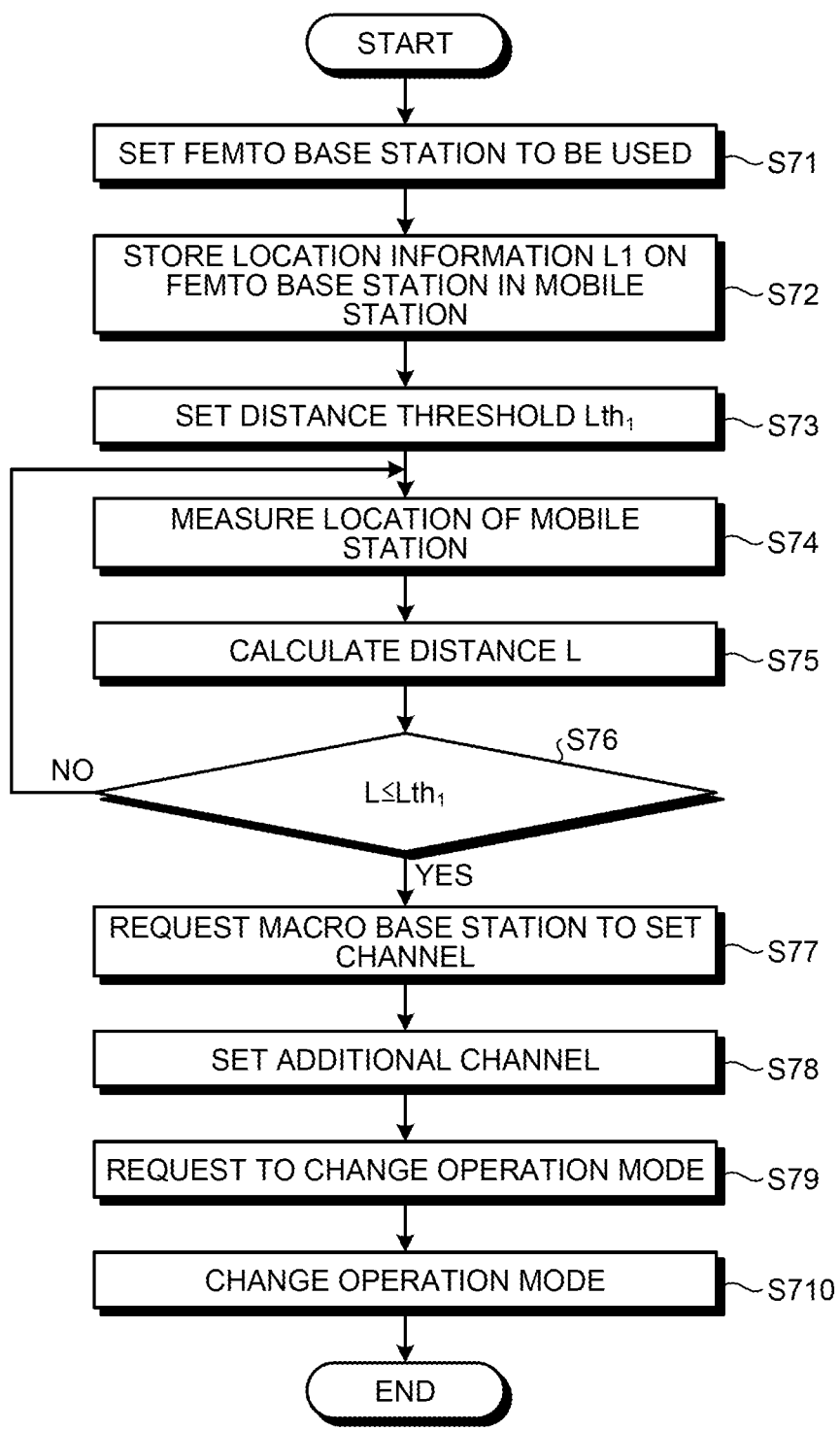
FIG. 19 is a flowchart illustrating an example of the flow of the operation of a wireless communication system according to the fourth embodiment.

In the following, the operation of the wireless communication system 1 according to the fourth embodiment will be described by mainly concentrating on the difference between the first embodiment and the fourth embodiment. FIG. 19 is a flowchart illustrating an example of the flow of the operation of the wireless communication system 1 according to the fourth embodiment. Because FIG. 19 illustrates the same processes as those illustrated in FIG. 8 that are referred to in the description of the operation according to the first embodiment, processes performed at the same steps are assigned reference numerals with the same last numbers and descriptions of such processes in detail are omitted. Specifically, the processes performed at Steps S71 to S77 illustrated in FIG. 19 correspond to the processes performed at Steps S1 to S7 illustrated in FIG. 8, respectively.

At Step S78, the channel control unit 32 in the macro base station 30 sets an additional channel between the macro base station 30 and the femto base station 20. At Step S79, by using the channel that is set at Step S118, the channel control unit 32 sends, to the femto base station 20 by using the sending unit 33, the operation control signal that is used to change the operation mode of the femto base station 20 from the electrical power saving mode into the normal operation mode. When the operation control unit 26 in the femto base station 20 detects that the operation control signal has been received, the operation control unit 26 changes its own operation mode from the previously used electrical power saving mode into the normal operation mode (Step S710). By doing so, it is possible to perform the operation control of the femto base station.

Seventh Modification

The wireless communication system 1 may also combine the distance determining process performed in the third embodiment with the process performed in the fourth embodiment described above. Namely, for the operation control performed on the femto base station 20, instead of performing the operation control, the macro base station 30 may also determine, by itself in accordance with a request from the mobile station 10, whether the operation control is needed based on the distance acquired from the mobile station 10. Furthermore, by using the location information on the mobile station 10 and the location information on the femto base station 20, the macro base station 30 may also calculate the distance by itself. In such a case, the location information on the femto base station 20 may also be acquired from the femto base station 20 or may also be acquired via the mobile station 10. With this method, it is also possible to obtain the same effect as that in the first to the fourth embodiments, i.e., it is possible to improve the transmission quality by maintaining a transmission speed due to a reduction of the handover time.

[e] Fifth Embodiment

In the following, a fifth embodiment will be described. The configuration of a wireless communication system according to the fifth embodiment is the same as that in the first embodiment illustrated in FIG. 1. Furthermore, the configuration of each of a mobile station, a femto base station, and a macro base station according to the fifth embodiment is the same as that of the mobile station 10, the femto base station 20, and the macro base station 30, respectively, according to the first embodiment. Accordingly, in the fifth embodiment, components having the same configuration as those in the first embodiment are assigned the same reference numerals and descriptions of such components in detail are omitted. The fifth embodiment differs from the fourth embodiment in that the operation control performed by the mobile station 10 on the macro base station 30 and the content of the channel control to be requested differ. Specifically, in the fourth embodiment, the mode changes from a stop mode or the electrical power saving mode into an operation mode or the normal operation mode, whereas, in the fifth embodiment, the mode changes from the operation mode or the normal operation mode into the stop mode or the electrical power saving mode. Furthermore, for the difference of the channel control, specifically, in the fourth embodiment, if the mobile station 10 approaches within a predetermined distance from the femto base station 20, the mobile station 10 requests the macro base station 30 to additionally set the channel, whereas, in the fifth embodiment, if the mobile station 10 is away from the femto base station 20 by the predetermined distance or more, the mobile station 10 requests the macro base station 30 to release (or delete) the set channel.

Figure 20:
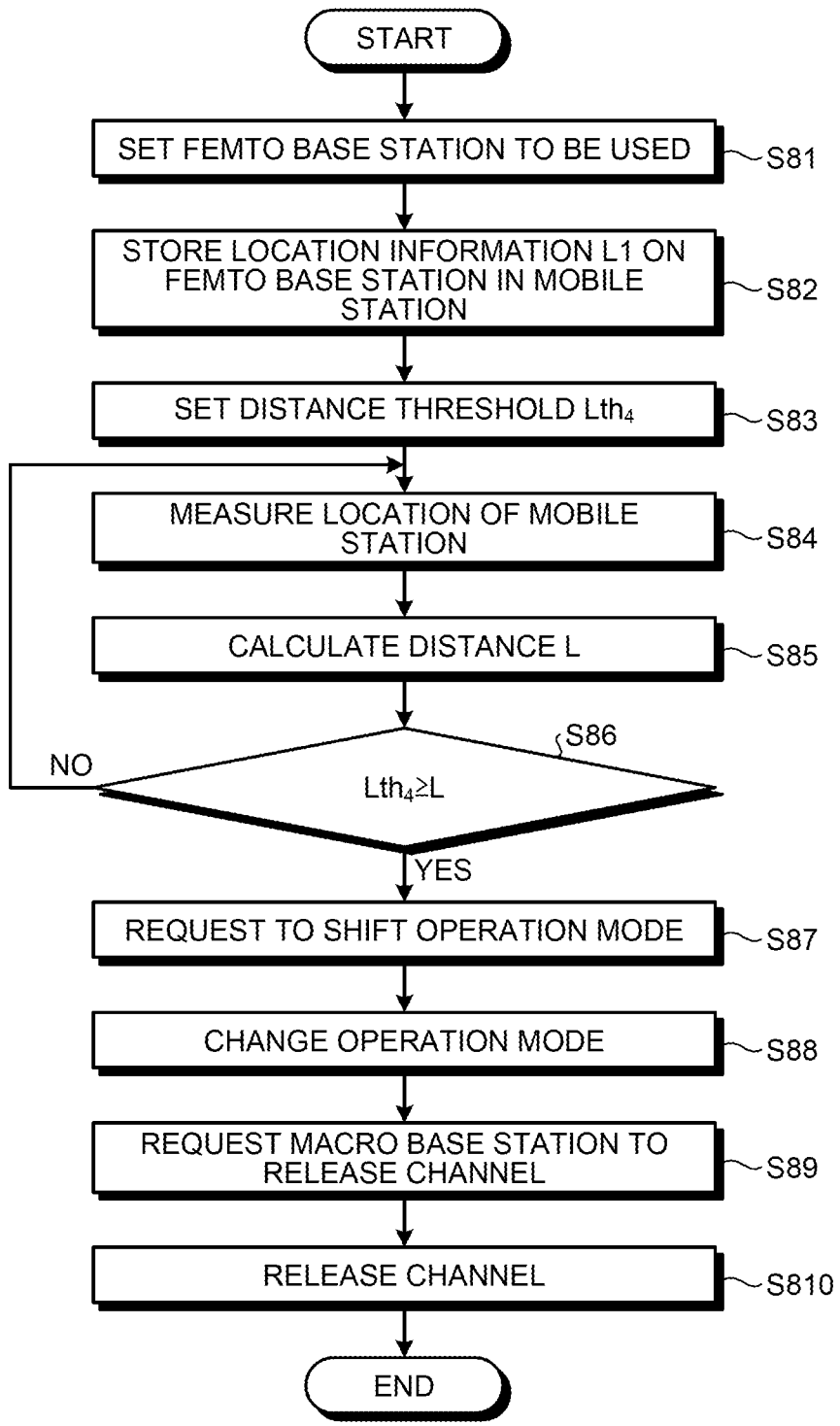
FIG. 20 is a flowchart illustrating an example of the flow of the operation of a wireless communication system according to a fifth embodiment.

FIG. 20 is a flowchart illustrating an example of the flow of the operation of the wireless communication system 1 according to a fifth embodiment. Because FIG. 20 illustrates the same processes as those illustrated in FIG. 10 that are referred to in the description of the operation according to the second embodiment and the same processes as those illustrated in FIG. 19 that are referred to in the description of the operation according to the fourth embodiment, processes performed at the same steps are assigned reference numerals with the same last numbers and descriptions of such processes in detail are omitted. Specifically, the processes performed at Steps S81 to S86, S89, and S810 illustrated in FIG. 20 correspond to the processes performed at Steps S21 to S26, S27, and S28 illustrated in FIG. 10, respectively. Furthermore, the processes performed at Steps S87 and S88 illustrated in FIG. 20 correspond to the processes performed at Steps S79 and S710 illustrated in FIG. 19, respectively.

As described above, the configuration described in the fifth embodiment is the combination of the configuration described in the second and the fourth embodiments. Namely, the macro base station 30 that has requested the femto base station 20 to change the operation mode from the operating mode or the normal operation mode into the stop mode or the electrical power saving mode releases the channel that is set between the femto base station 20 and also releases the channel that is set between the upper-layer apparatus. Accordingly, the wireless communication system 1 can change the femto base station 20 whose operation is not needed any more due to the separation of the mobile station 10 into the electrical power saving mode and allocate the femto base station 20 to the other mobile station by promptly and reliably releasing the channel. Consequently, the system resources can be efficiently used.

[f] Sixth Embodiment

In the following, a sixth embodiment will be described. The configuration of a wireless communication system according to the sixth embodiment is the same as that of the wireless communication system according to the first embodiment illustrated in FIG. 1. Furthermore, the configuration of each of a mobile station, a femto base station, and a macro base station according to the sixth embodiment is the same as that of the mobile station 10, the femto base station 20, and the macro base station 30, respectively, according to the fourth embodiment. Accordingly, in the sixth embodiment, components having the same configuration as those in the fourth embodiment are assigned the same reference numerals and descriptions of such components in detail are omitted. The sixth embodiment differs from the fourth embodiment in that the femto base station 20 variably selects (or decides), in accordance with the mobile stations, whether to permit the operation control with respect to the own station, i.e., the femto base station 20.

Figure 21:
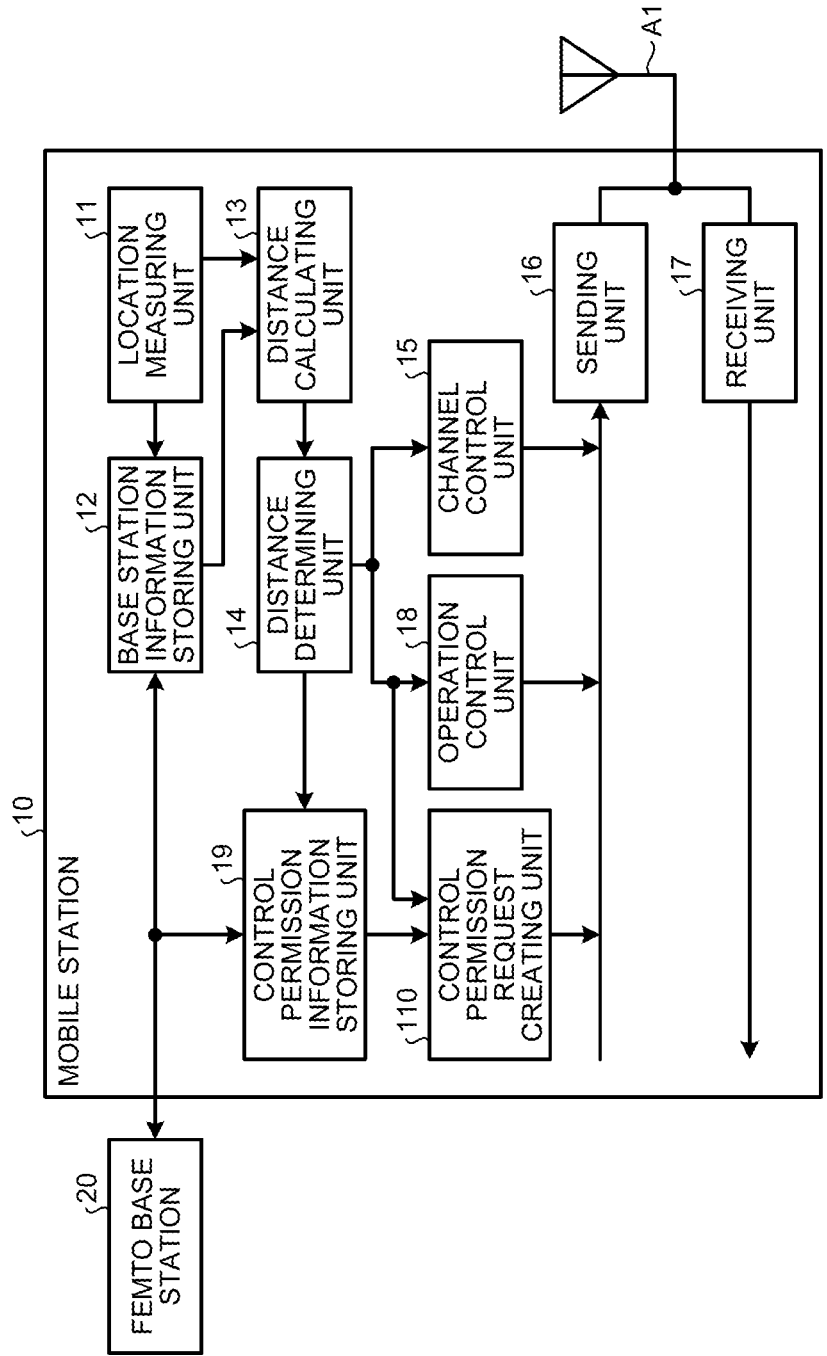
FIG. 21 is a schematic diagram illustrating an example of the functional configuration of a mobile station according to a sixth embodiment.

FIG. 21 is a schematic diagram illustrating an example of the functional configuration of the mobile station 10 according to the sixth embodiment. As illustrated in FIG. 21, the configuration of the mobile station 10 is the same as that of the mobile station 10 illustrated in FIG. 16 except that a control permission information storing unit 19 and a control permission request generating unit 110 are included. Accordingly, components having the same configuration are assigned the same reference numerals and descriptions of such components in detail are omitted. The control permission information storing unit 19 stores therein an identification code for allowing the operation control with respect to the femto base station 20 or a command for receiving permission to perform the operation control as control permission information. The control permission request generating unit 110 generates information for requesting permission to perform the operation control with respect to the femto base station 20. The generated information is sent by the sending unit 16 to the femto base station 20 as a control permission request.

Figure 22:
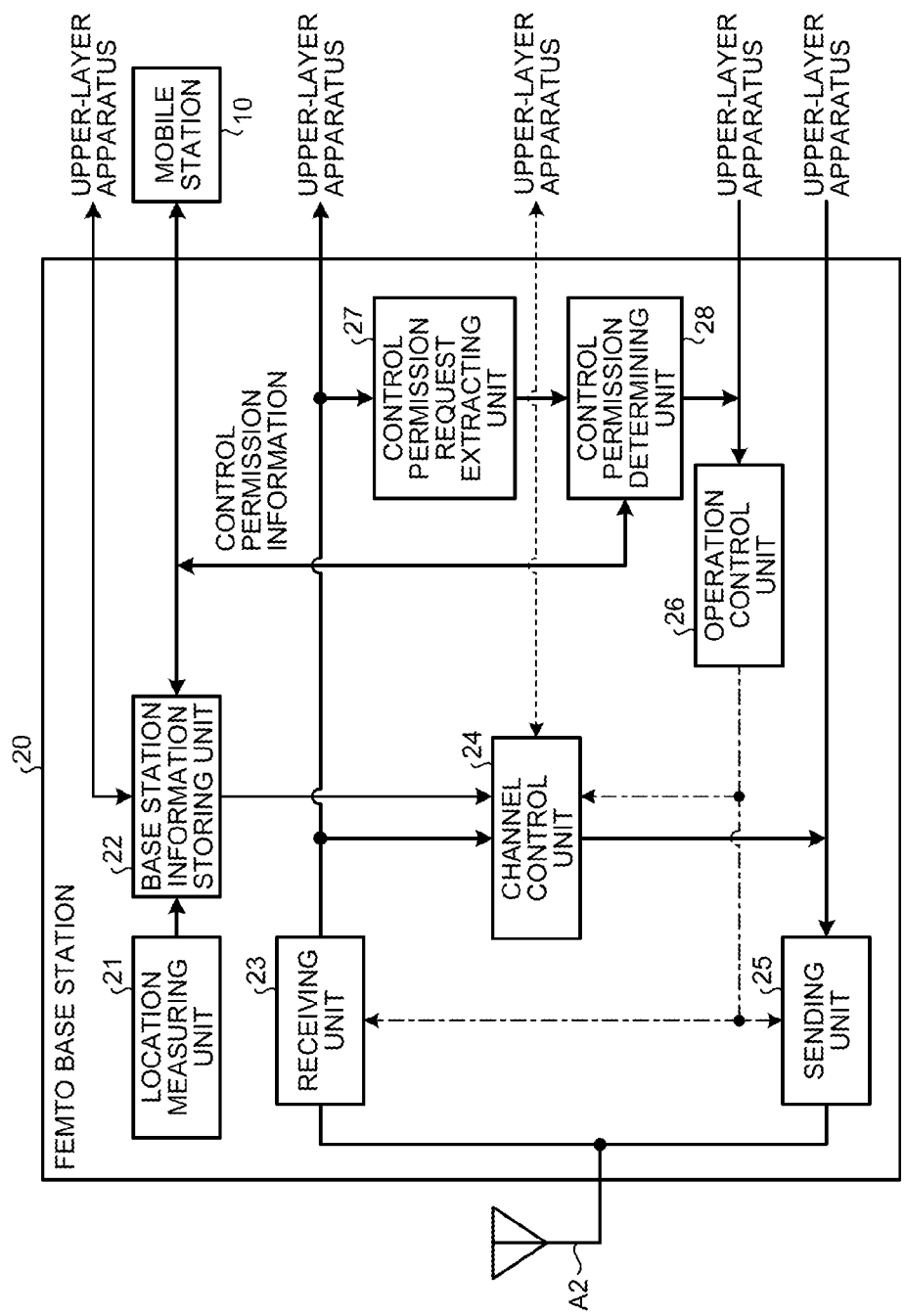
FIG. 22 is a schematic diagram illustrating an example of the functional configuration of a femto base station according to the sixth embodiment.

FIG. 22 is a schematic diagram illustrating an example of the functional configuration of the femto base station 20 according to the sixth embodiment. As illustrated in FIG. 22, the configuration of the femto base station 20 is the same as that of the femto base station 20 illustrated in FIG. 17 except that a control permission request extracting unit 27 and a control permission determining unit 28 are included. Accordingly, components having the same configuration are assigned the same reference numerals and descriptions of such components in detail are omitted. The control permission request extracting unit 27 extracts the control permission request described above from the information received from the mobile station 10 or the macro base station 30. The control permission determining unit 28 determines, in accordance with the control permission request, whether the operation control with respect to the femto base station 20 is permitted and then outputs the determination result thereof to the operation control unit 26 that is arranged downstream. Furthermore, in addition to information related to the femto base station 20, information related to a mobile station that can be connected to the femto base station 20 is stored in the base station information storing unit 22. Furthermore, information (for example, identification information) related to a mobile station in which the operation control with respect to the femto base station 20 has been permitted is stored.

Figure 23:
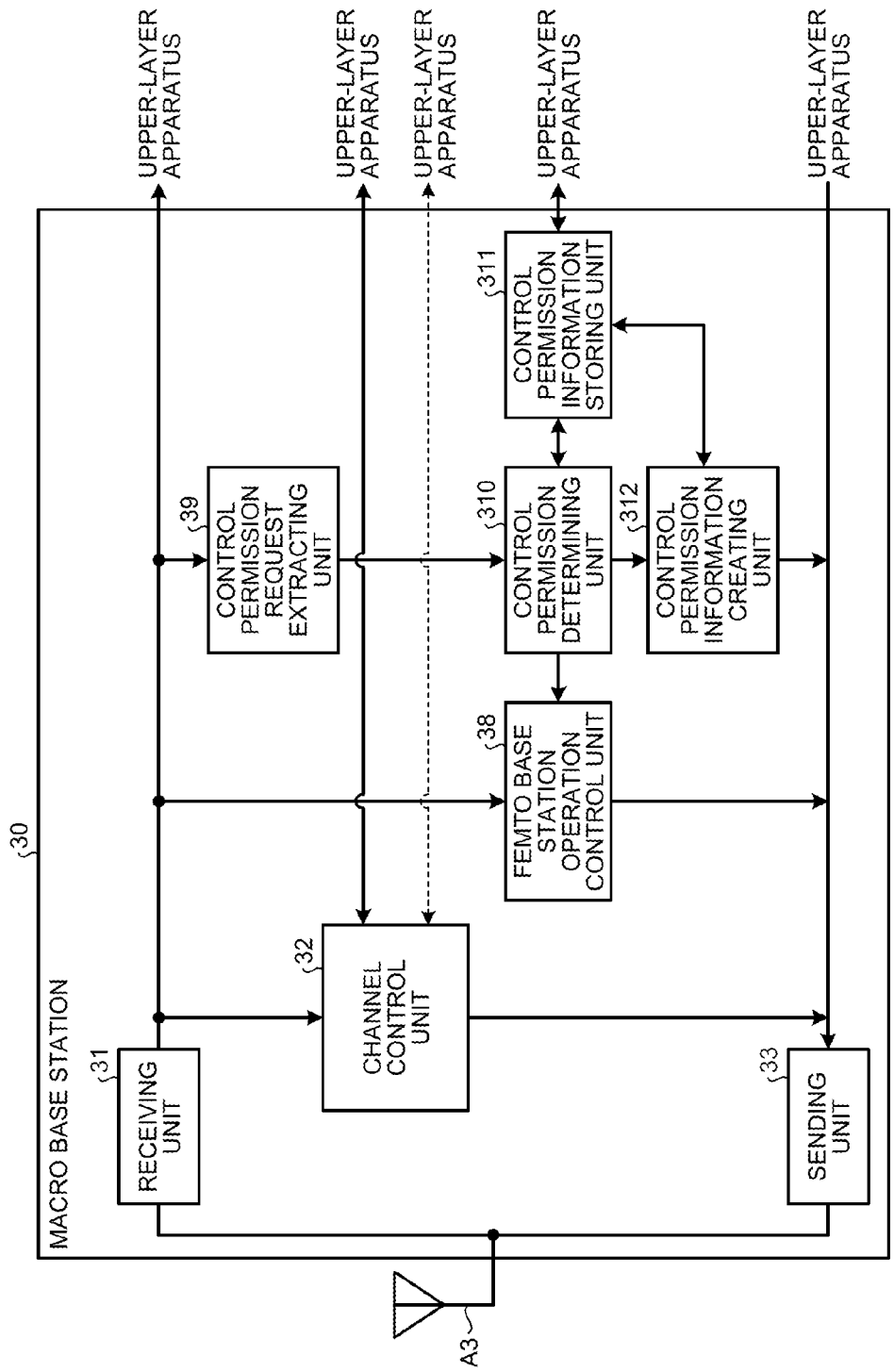
FIG. 23 is a schematic diagram illustrating an example of the functional configuration of a macro base station according to the sixth embodiment.

FIG. 23 is a schematic diagram illustrating an example of the functional configuration of the macro base station 30 according to the sixth embodiment. As illustrated in FIG. 23, the configuration of the femto base station 20 is the same as that of the macro base station 30 illustrated in FIG. 18 except that a control permission request extracting unit 39, a control permission determining unit 310, a control permission information storing unit 311, and a control permission information generating unit 312 are included. Accordingly, components having the same configuration are assigned the same reference numerals and descriptions of such components in detail are omitted. The control permission request extracting unit 39 extracts the control permission request described above from the information received from the mobile station 10. The control permission determining unit 310 determines, in accordance with the control permission request, whether the operation control with respect to the femto base station 20 is permitted and outputs the determination result thereof to the femto base station operation control unit 38 that is arranged downstream. The control permission information storing unit 311 stores therein an identification code for allowing the operation control with respect to the femto base station 20 or a command for receiving permission to perform the operation control as control permission information. The control permission information generating unit 312 generates the control permission information described above. The generated information is associated with the identification information on the mobile station that is the request source for the control permission and then sent by the sending unit 33 to the femto base station 20.

In the sixth embodiment, when the mobile station 10 sends a request for the setting of a channel to the femto base station 20 to the macro base station 30 or the upper-layer apparatus of the macro base station 30, the mobile station 10 also sends information (for example, permitted terminal number and a command that is used to receive control permission) that is used to allow the operation control with respect to the femto base station 20. Furthermore, the information may also be sent at the time of setting of the channel to the macro base station 30 to which the mobile station 10 is connected.

After the channel from the macro base station 30 to the femto base station 20 has been set, the mobile station 10 requests the femto base station 20 to change the operation from the electrical power saving mode into the normal operation mode. Namely, the mobile station 10 generates an operation control signal that is a signal for changing the operation of the femto base station 20 from the electrical power saving mode into the normal operation mode and then sends the signal to the femto base station 20 via the macro base station 30. The macro base station 30 that has been received the request for setting the channel sets an additional channel with the femto base station 20. After the setting of the channel has been completed, the macro base station 30 sends the operation control signal received from the mobile station 10 to the femto base station 20. The femto base station 20 that has been received the operation control signal sets an additional channel with the macro base station 30. Then, in accordance with the received operation control signal, the femto base station 20 changes its own operation mode from the electrical power saving mode into the normal operation mode.

As described above, in the sixth embodiment, by expecting a handover to the femto base station 20 and previously setting the channel to the femto base station 20, thereby the wireless communication system 1 can also reduce the time needed to perform the handover. Furthermore, the wireless communication system 1 can estimate a handover and previously change the operation mode of the femto base station 20 into the normal operation mode. Accordingly, the wireless communication system 1 can reduce the time needed for a handover compared with a case in which a handover is performed in the electrical power saving mode without changing the mode. Consequently, the time period for which a channel is disconnected is reduced and thus a reduction in the transmission speed can be suppressed.

Furthermore, the femto base station 20 manages, for each mobile station, whether its own operation mode can be changed. Accordingly, the femto base station 20 can narrow down, from among the mobile stations that can be connected to the femto base station 20, a mobile station that can be subjected to the operation control with respect to the femto base station 20. Accordingly, it is possible to prevent operation control that is performed by an unauthorized third party. Furthermore, in general, because a user that installs the femto base station 20 bears the cost of communication or electricity, from the viewpoint of operation of the femto base station 20, it is preferable that the femto base station 20 permit only a specific mobile station to use an operation control function.

Furthermore, if a plurality of mobile stations that can be subjected to the operation control are present for each femto base station 20, when at least a single mobile station approaches the femto base station 20, the femto base station 20 may also change the operation mode into the normal operation mode. Alternatively, the femto base station 20 may also change into the operation mode based on the ratio of the number of mobile stations approach the femto base station 20 to the number of mobile stations that can be connected. Furthermore, the femto base station 20 may also change the operation mode based on the number of mobile stations that are being connected. Furthermore, a combination of these references may also be used.

Furthermore, in the sixth embodiment, a description has been given of the electrical power saving mode and normal operation mode as example of the operation modes of the femto base station 20. In particular, for the electrical power saving mode, a description has been given of a mode in which some operation is intermittently operated. However, any mode may also be used for the electrical power saving mode as long as a mode in which an operation control signal that is sent from the mobile station 10 or the upper-layer apparatus of the mobile station 10 can intermittently or always be received. In other words, from among the functional components in the femto base station 20, if the component having the function of receiving an operation control signal can be used, all of the functions performed by the other components may also be stopped. In such a case, the femto base station 20 stops almost all operations; however, by using this state as a stop mode, the femto base station 20 may also perform control by replacing this mode with the electrical power saving mode.

Furthermore, the name of each of the operation modes, i.e., the electrical power saving mode, the normal operation mode, and the stop mode, is used for convenience of description. Even if the name that is different from the name of the operation modes is used, the mode is the same as that described above as long as the function of the mode is the same. In contrast, even if the same name is allocated to multiple modes targeted for the comparison, these modes differ if these modes are modes each having different functions.

Eighth Modification

The wireless communication system 1 may also combine the distance determining process according to the third embodiment with the sixth embodiment described above. Namely, for the operation control performed with respect to the femto base station 20, instead of performing the operation control in accordance with the request from the mobile station 10, the macro base station 30 may also determine, by itself, whether the operation control is needed based on the distance acquired from the mobile station 10. Furthermore, by using the location information on the mobile station 10 and the location information on the femto base station 20, the macro base station 30 may also calculate the distance by itself. In such a case, the location information on the femto base station 20 may also be acquired from the femto base station 20 or may also be acquired via the mobile station 10. With this method, it is also obtain the same effect as that performed in the first to the six embodiments, i.e., a reduction in time needed for a handover can suppress a reduction in the transmission speed, and thus the quality of transmission can be improved.

[g] Seventh Embodiment

Figure 24:
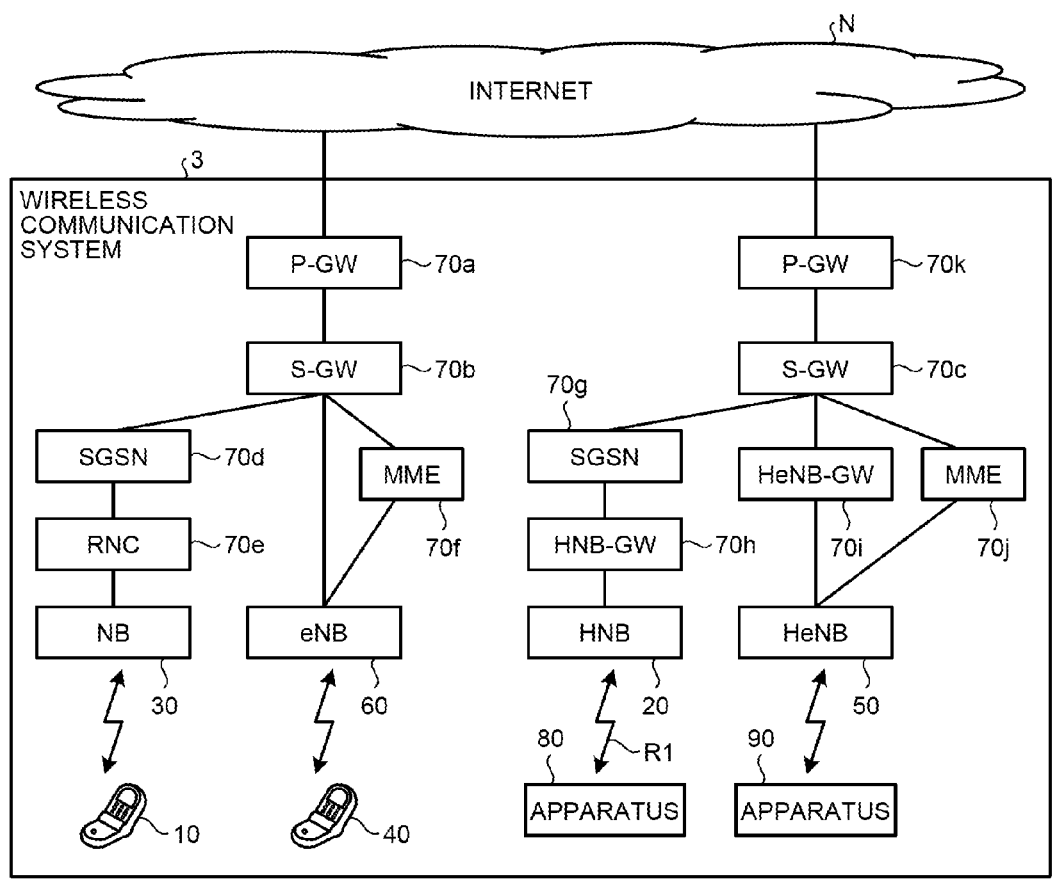
FIG. 24 is a schematic diagram illustrating an example of the functional configuration of a wireless communication system according to a seventh embodiment.

In the following, a seventh embodiment will be described. FIG. 24 is a schematic diagram illustrating an example of the functional configuration of a wireless communication system 3 according to a seventh embodiment. The configuration of the wireless communication system 3 according to the seventh embodiment is the same as that of the wireless communication system 1 according to each of the embodiments described above except that the an apparatus 80 is connected to the femto base station 20 serving as an HNB and except that an apparatus 90 is connected to the femto base station 50 serving as an HeNB. Accordingly, descriptions thereof in detail will be omitted; however, the wireless communication system 3 is a system in which W-CDMA and LTE are used as a wireless communication method. As illustrated in FIG. 24, the wireless communication system 3 includes at least the mobile station 10, the femto base station 20, and the macro base station 30, which will be described later. The mobile station 10 sends and receives various signals or data to and from the femto base station 20 and the macro base station 30. Furthermore, similarly to the wireless communication system 1 illustrated in FIG. 1, the wireless communication system 3 may also use the type of network in which the femto base station 20 is directly connected, instead of via the Internet N, to a mobile telecommunications network to which the mobile station 10 belongs.

The apparatuses 80 and 90 are devices that start up or stop their operation when, as a trigger, the apparatuses 80 and 90 receive an apparatus control signal that is sent from the mobile station 10 passing through the macro base station 30, the upper-layer apparatus, and the femto base station 20. The apparatuses 80 and 90 are, for example, air conditioners, lighting apparatuses, personal computers (PC), or the like, in which the power supply is turned on when a user is at home and the power supply is turned off when a user is away from home. However, in contrast, the apparatuses 80 and 90 may also be a monitor or a crime prevention device, such as a lock, that are needed to be operated when a user is not at home. Furthermore, in FIG. 24 illustrates the connection between the apparatuses 80 and 90 and the femto base stations 20 and 50, respectively, as wireless connection; however, wired connection, such as a USB interface or the like, may also be used.

Figure 25:
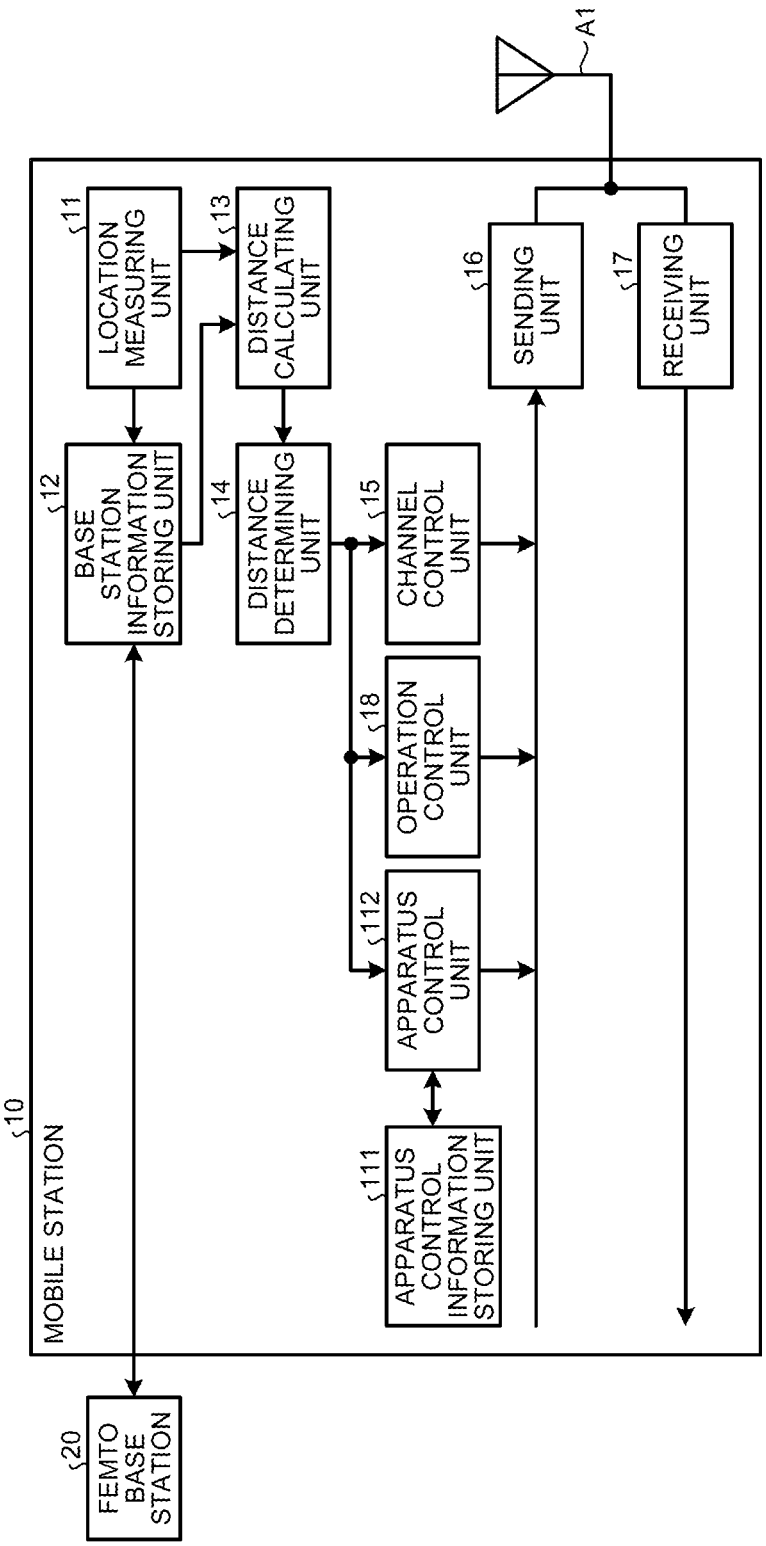
FIG. 25 is a schematic diagram illustrating an example of the functional configuration of a mobile station according to the seventh embodiment.

FIG. 25 is a schematic diagram illustrating an example of the functional configuration of the mobile station 10 according to the seventh embodiment. As illustrated in FIG. 25, the configuration of the mobile station 10 is the same as that of the mobile station 10 illustrated in FIG. 21 except that an apparatus control information storing unit 111 and an apparatus control unit 112 are included. Accordingly, components having the same configuration are assigned the same reference numerals and descriptions of such components in detail are omitted. The apparatus control information storing unit 111 stores information (for example, an identifier on the apparatus, control content, and a control command) that is used to control the apparatus 80 as apparatus control information. The apparatus control unit 112 determines, based on the comparison result that is input from the distance determining unit 14, whether control of the apparatus 80 is needed. If it is determined that the control is needed, the apparatus control unit 112 generates a signal, i.e., an apparatus control signal, that is used to perform the apparatus control.

Figure 26:
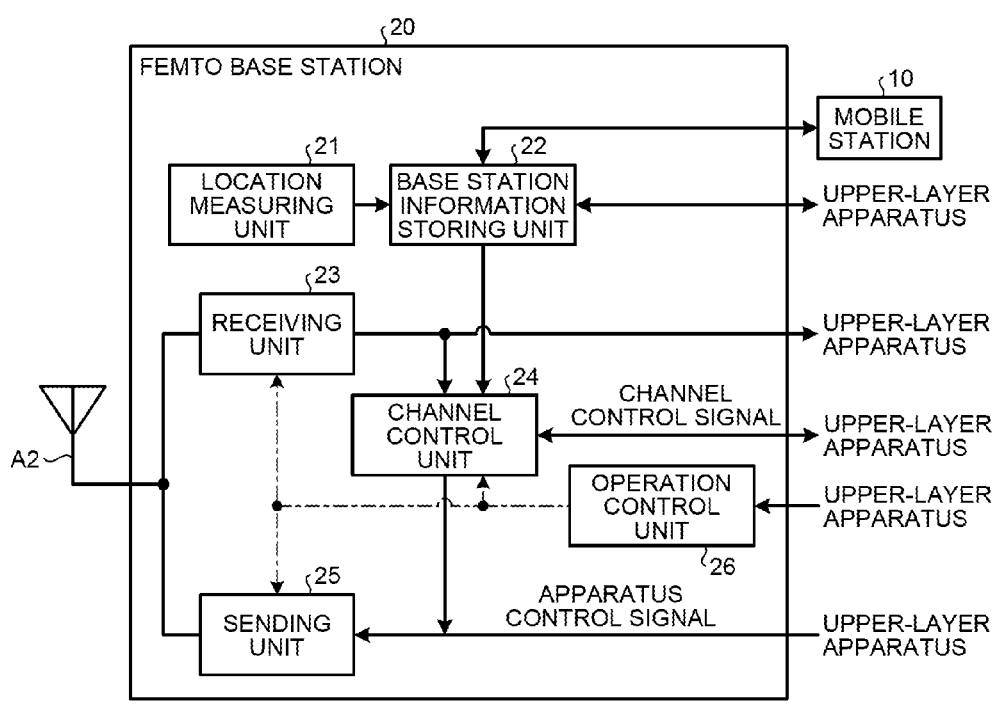
FIG. 26 is a schematic diagram illustrating an example of the functional configuration of a femto base station according to the seventh embodiment.

FIG. 26 is a schematic diagram illustrating an example of the functional configuration of the femto base station 20 according to the seventh embodiment. As illustrated in FIG. 26, the configuration of the femto base station 20 is the same as that of the femto base station 20 illustrated in FIG. 22. Accordingly, components having the same configuration are assigned the same reference numerals and descriptions of such components in detail are omitted. The channel control unit 24 controls a channel R1 (see FIG. 24) that is used for apparatus control in accordance with a signal (a channel control signal) that is used to control the channel between the femto base station 20 and the apparatus 80. The sending unit 25 sends, in accordance with the channel control signal described above that is input from the channel control unit 24, the apparatus control signal that has been received from the upper-layer apparatus to the apparatus 80 via the antenna A2. Based on the instruction content, the apparatus 80 that has received the apparatus control signal performs the control of, for example, turning on and off the power supply, changing a set value, or the like.

Figure 27:
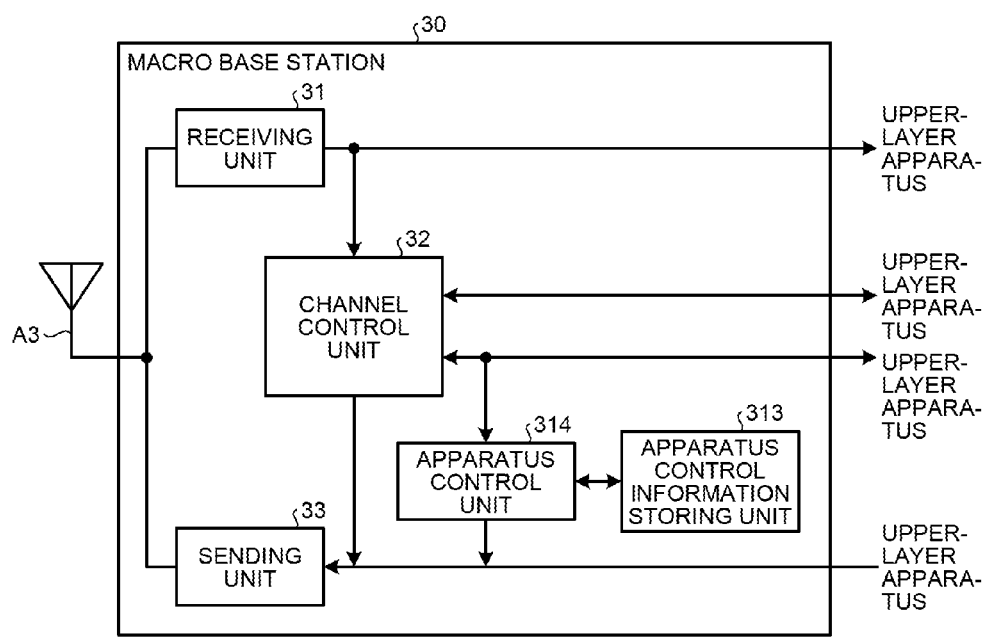
FIG. 27 is a schematic diagram illustrating an example of the functional configuration of a macro base station according to the seventh embodiment.

FIG. 27 is a schematic diagram illustrating an example of the functional configuration of the macro base station 30 according to the seventh embodiment. As illustrated in FIG. 27, the configuration of the femto base station 20 is the same as that of the macro base station 30 illustrated in FIG. 23 except that an apparatus control information storing unit 313 and an apparatus control unit 314 are included. Accordingly, components having the same configuration are assigned the same reference numerals and descriptions of such components in detail are omitted. The apparatus control information storing unit 313 stores therein apparatus control information (for example, an identifier of the apparatus, the control content, control command) that is previously acquired from the mobile station 10 or the femto base station 20. In accordance with the apparatus control request received from the mobile station 10, the apparatus control unit 314 generates an apparatus control signal that is used to control the apparatus 80 and instructs the sending unit 33 to send the apparatus control signal to the femto base station 20.

Figure 28:
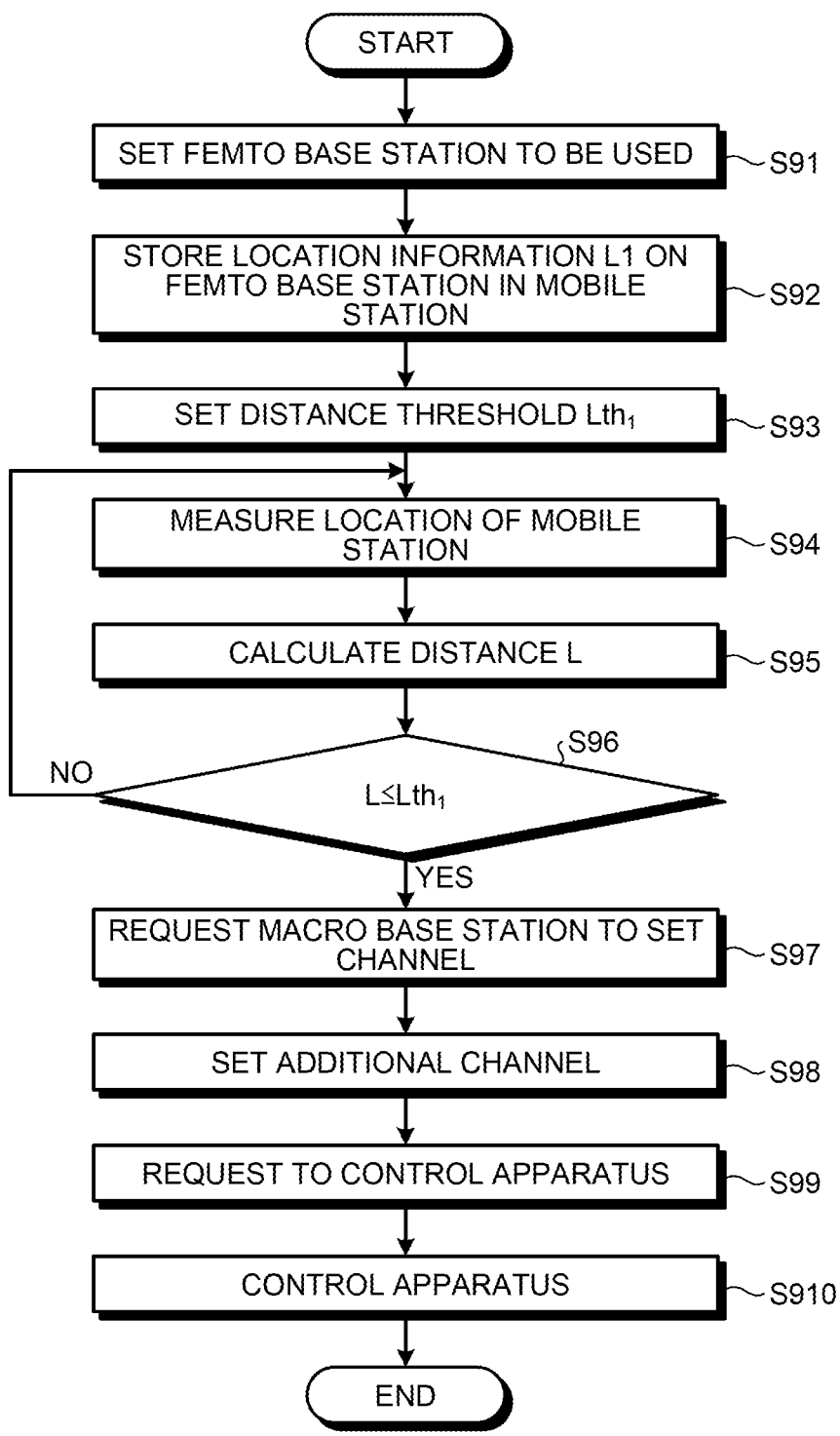
FIG. 28 is a schematic diagram illustrating an example of the operation of the wireless communication system according to the seventh embodiment.

In the following, the operation of the wireless communication system 3 according to the seventh embodiment will be described by mainly concentrating on the difference between the fourth embodiment and the seventh embodiment. FIG. 28 is a schematic diagram illustrating an example of the operation of the wireless communication system 3 according to the seventh embodiment. Because FIG. 28 illustrates the same processes as those illustrated in FIG. 19 that are referred to in the description of the operation according to the seventh embodiment, processes performed at the same steps are assigned reference numerals with the same last numbers and descriptions of such processes in detail are omitted. Specifically, the processes performed at Steps S91 to S98 illustrated in FIG. 28 correspond to the processes performed at Steps S71 to S78 illustrated in FIG. 19, respectively.

At Step S99, the channel control unit 32 in the macro base station 30 uses the channel that is set at Step S98 and sends, to the femto base station 20 by using the sending unit 33, a signal that is used to request the femto base station 20 to control the apparatus 80. When the channel control unit 24 in the femto base station 20 detects that the signal described above has been received, the channel control unit 24 controls the apparatus 80 via the wireless channel R1 (Step S910). The control content varies depending on the apparatus control signal described above. For example, if the apparatus 80 that is to be controlled is an air conditioner, examples of the control content include turning on or off a power supply, setting an operation mode (cooling, heating, drying), adjusting a preset temperature, increasing or decreasing the air volume, or the like. Furthermore, if the apparatus 80 is a lighting apparatus, examples of the control content include turning on or off a switch, changing luminance, or the like. By doing so, when a user of the mobile station 10 returns home, a comfortable environment is provided at user's home.

An example of a function that can be used for setting the channel between the femto base station 20 and the apparatus 80 includes a paging (calling) function or a random access function used in LTE or W-CDMA. After the end of the control of the apparatus, the femto base station 20 may also release the set channel. However, even if the femto base station 20 turns off the power supply of the apparatus 80, the femto base station 20 allows at least the function of communicating with the femto base station 20 to be intermittently operated or to be operated in a normal operation state, instead of stopping all of the functions.

Ninth Modification

Figure 29:
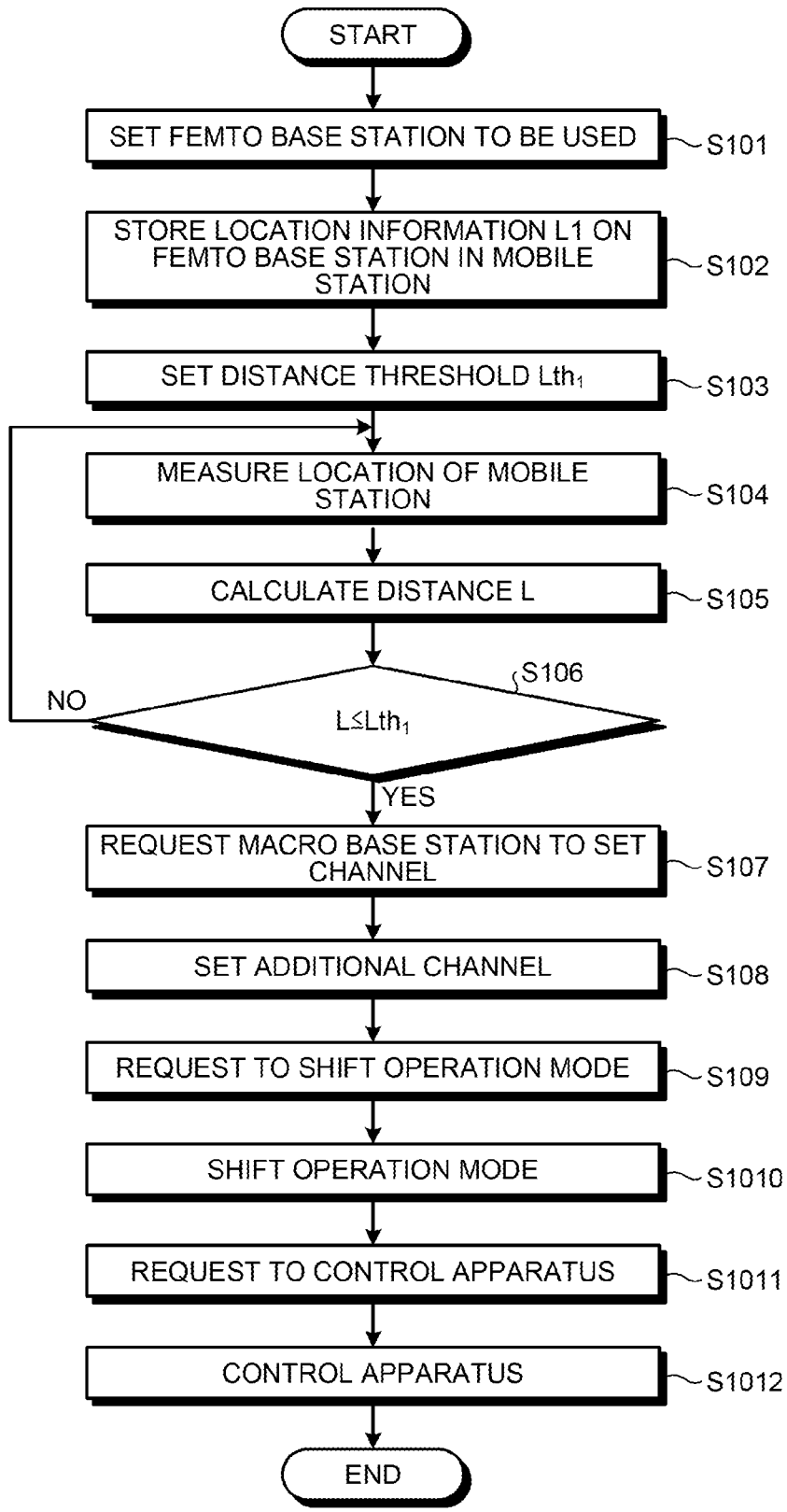
FIG. 29 is a schematic diagram illustrating an example of the operation of the wireless communication system according to a ninth modification of the seventh embodiment.

The wireless communication system 3 may also use a method in which the operation control technology described in the fourth embodiment is combined with that described in the seventh embodiment. Namely, in response to a request from the mobile station 10, the wireless communication system 3 changes the operation mode of the femto base station 20 by using the channel between the macro base station 30 and the femto base station 20 and then controls the behavior of the apparatus 80 that is connected to the femto base station 20. FIG. 29 is a schematic diagram illustrating an example of the operation of the wireless communication system 3 according to a ninth modification of the seventh embodiment. Because FIG. 29 illustrates the same processes as those illustrated in FIG. 28 that are referred to in the description of the operation according to the seventh embodiment and the same processes as those illustrated in FIG. 20 that are referred to in the description of the operation according to the fifth embodiment, processes performed at the same steps are assigned reference numerals with the same last numbers and descriptions of such processes in detail are omitted. Specifically, the processes performed at Steps S101 to S108, S1011, and S1012 illustrated in FIG. 29 correspond to the processes performed at Steps S91 to S98, S99, and S910 illustrated in FIG. 28, respectively. Furthermore, the processes performed at Steps S109 and S1010 illustrated in FIG. 29 correspond to the processes performed at Steps S87 and S88 illustrated in FIG. 20, respectively.

Tenth Modification

The wireless communication system 3 may also combine the distance determining process according to the third embodiment with the seventh embodiment described above. Namely, for the control of the apparatus 80, instead of controlling the apparatus in accordance with the request from the mobile station 10, the macro base station 30 may also determine, by itself, whether the control of the apparatus is needed based on the distance acquired from the mobile station 10. Furthermore, by using the location information on the mobile station 10 and the location information on the femto base station 20, the macro base station 30 may also calculate the distance by itself. In such a case, the location information on the femto base station 20 may also be acquired from the femto base station 20 or may also be acquired via the mobile station 10. With this method, it is also possible to obtain the same effect as that performed in the first to the seventh embodiments, i.e., a reduction in time needed for a handover can suppress a reduction in the transmission speed, and thus the quality of transmission can be improved.

As described above, the wireless communication systems 1 and 2 according to the first to sixth embodiments may also be used to control the other apparatuses 80 and 90 that are connected to the femto base station 20. For example, by using a timer function, an air conditioner can be operated in accordance with the time at which a user returns home. However, if the time at which a user returns home varies, it is difficult to flexibly cope with the variation in the time. Accordingly, there is a method in which a user controls on/off of the air conditioner via a network outside the user's home; however, with this method, because the user needs to give an instruction by himself/herself, there is a problem in that the user forgets to give an instruction or it takes time and effort for the user to give an instruction.

With the wireless communication system 3 according to the seventh embodiment, the mobile station 10 determines, based on the distance between the femto base station 20, whether the mobile station 10 approaches the femto base station 20 or is away from the femto base station 20. If the mobile station 10 approaches the femto base station 20, the mobile station 10 sets a channel with the femto base station 20 and sends, by using the set channel, a control signal that controls the setting of the apparatus 80 of on/off the power supply of the apparatus 80 to the apparatus 80 via the femto base station 20. For example, if the apparatus 80 is an air conditioner, the switch thereof is turned on. In contrast, if the mobile station 10 is away from the femto base station 20, the mobile station 10 releases, due to the sending of the control signal described above, the channel to the femto base station 20. For example, if the apparatus 80 is an air conditioner, a switch thereof is turned off. Consequently, the wireless communication system 3 can automatically control the apparatus 80 that is connected to the femto base station 20 before a user returns home or when a user goes to work. For example, if the apparatus 80 that is to be controlled is an air conditioner, the wireless communication system 3 automatically turns on the power supply before a user returns home, thereby the room temperature is adjusted at a temperature comfortable for a user when the user returns home without waiting for the operation performed by the user. Furthermore, by automatically turning off the power supply when a user goes to work, it is possible to prevent the turning off of a power supply from being forgotten even if no operation is performed by a user and thus power-saving effect can be acquired.

[h] Eighth Embodiment

In the following, an eighth embodiment will be described. The configuration of a wireless communication system according to the eighth embodiment is the same as that of the wireless communication system according to the seventh embodiment illustrated in FIG. 24. Furthermore, the configuration of each of a mobile station, a femto base station, and a macro base station according to the eighth embodiment is the same as that of the mobile station 10, the femto base station 20, and the macro base station 30 according to the seventh embodiment. Accordingly, in the eighth embodiment, components having the same configuration as those in the seventh embodiment are assigned the same reference numerals and descriptions of such components in detail are omitted. The eighth embodiment differs from the seventh embodiment in that the content of the channel control that is requested by the mobile station 10 from the macro base station 30. Specifically, in the seventh embodiment, when the mobile station 10 approaches within a predetermined distance from the femto base station 20, the mobile station 10 requests the macro base station 30 to set an additional channel. In contrast, in the eighth embodiment, when the mobile station 10 moves away from the femto base station 20 by the distance equal to or greater than the predetermined distance, the mobile station 10 requests the macro base station 30 to delete the set channel.

Figure 30:
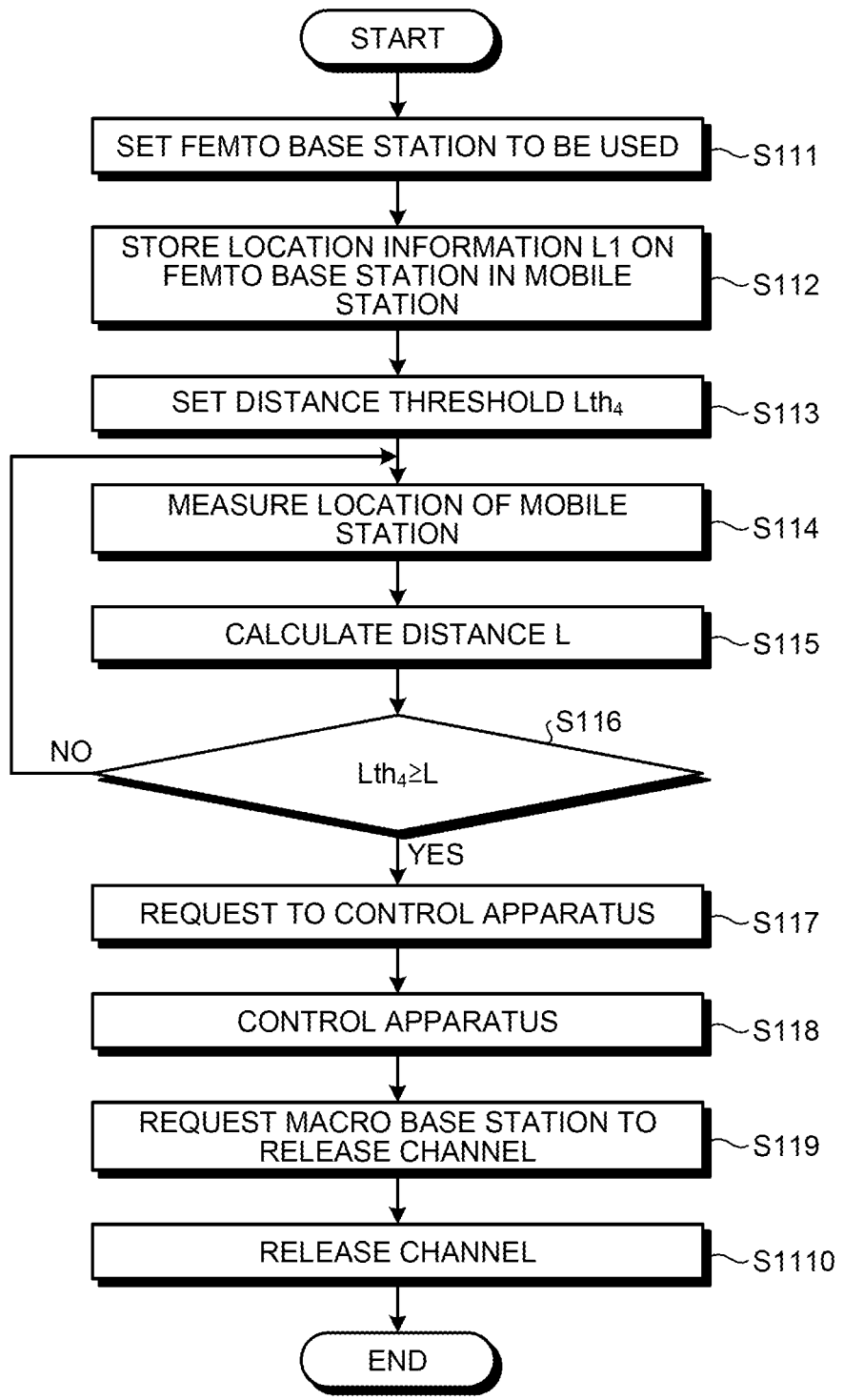
FIG. 30 is a flowchart illustrating an example of the flow of the operation of a wireless communication system according to an eighth embodiment.

FIG. 30 is a flowchart illustrating an example of the flow of the operation of the wireless communication system 3 according to an eighth embodiment. Because FIG. 30 illustrates the same processes as those illustrated in FIG. 20 that are referred to in the description of the operation according to the fifth embodiment and the same processes as those illustrated in FIG. 28 that are referred to in the description of the operation according to the seventh embodiment, processes performed at the same steps are assigned reference numerals with the same last numbers and descriptions of such processes in detail are omitted. Specifically, the processes performed at Steps S111 to S116, S119, and S1110 illustrated in FIG. 30 correspond to the processes performed at Steps S121 to S126, S129, and S1210 illustrated in FIG. 31, respectively. Furthermore, the processes performed at Steps S117 and S118 illustrated in FIG. 30 correspond to the processes performed at Steps S99 and S910 illustrated in FIG. 28.

As described above, the method used in the eighth embodiment is a combination of the method used in the second and the seventh embodiments. With this method, the apparatus 80 can also be controlled. Namely, the macro base station 30 that has requested the femto base station 20 to control the apparatus releases the channel that is set with the femto base station 20 and also instructs the upper-layer apparatus to release the channel. Accordingly, the wireless communication system 3 can turn off the power supply of the apparatus 80 whose operation is not needed any more due to the separation of the mobile station 10 and allocate the femto base station 20 to the other mobile station by promptly and reliably releasing the channel. Consequently, the system resources can be efficiently used.

Eleventh Modification

Figure 31:
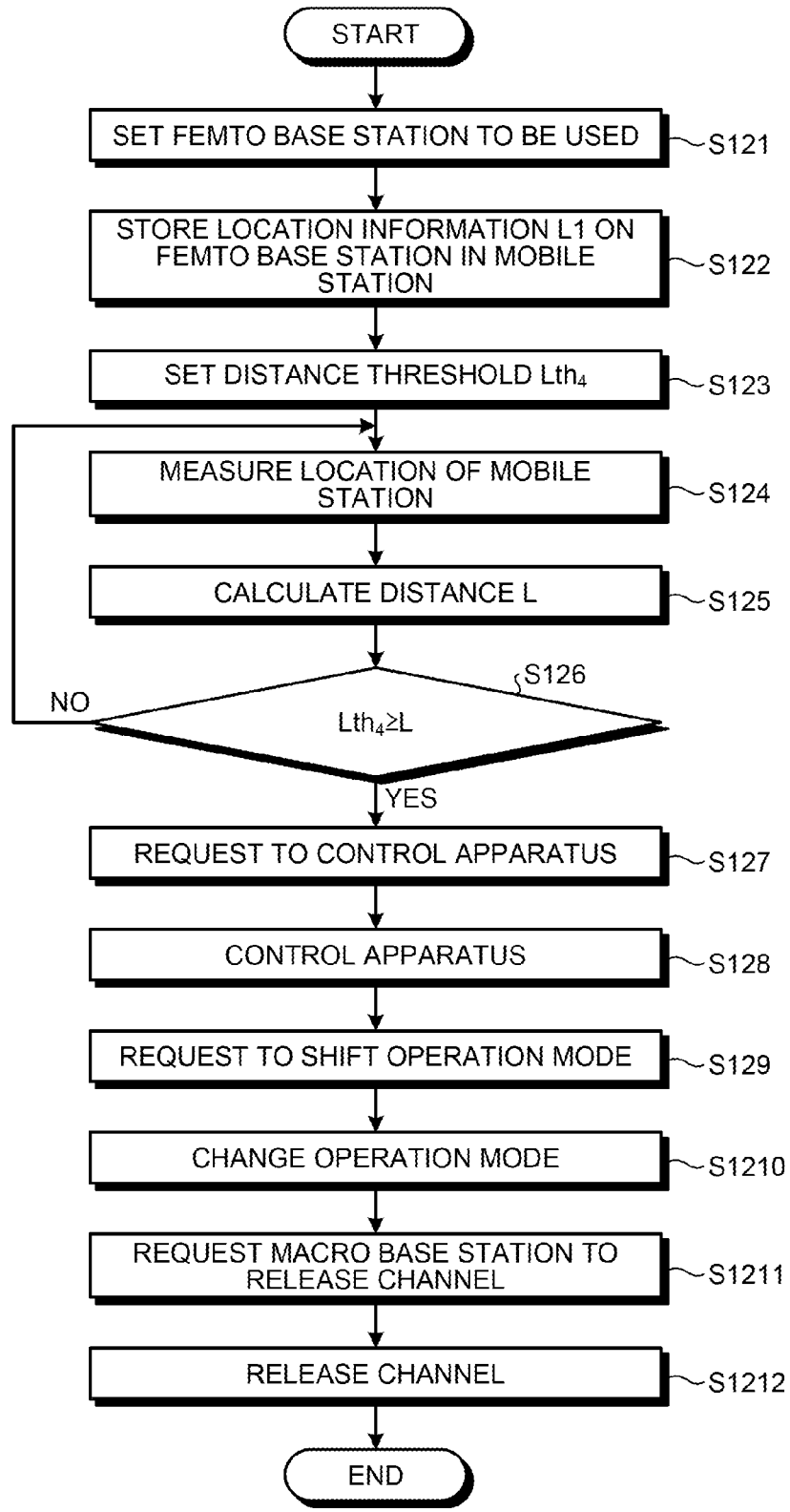
FIG. 31 is a flowchart illustrating an example of the flow of the operation of a wireless communication system according to the eleventh modification of the eighth embodiment.

The wireless communication system 3 may also use a method in which the operation control technology described in the fourth embodiment is combined with that described in the eighth embodiment. Namely, in accordance with the request from the mobile station 10, by using the channel between the macro base station 30 and the femto base station 20, the wireless communication system 3 according to an eleventh modification controls the behavior of the apparatus 80 that is connected to the femto base station 20. Then, the wireless communication system 3 may also change the operation mode of the femto base station 20 from the normal operation mode into the electrical power saving mode and, furthermore, may also release the channel described above. FIG. 31 is a flowchart illustrating an example of the flow of the operation of the wireless communication system 3 according to the eleventh modification of the eighth embodiment. Because FIG. 31 illustrates the same processes as those illustrated in FIG. 30 that are referred to in the description of the operation according to the eighth embodiment and the same processes as those illustrated in FIG. 29 that are referred to in the description of the operation according to the ninth modification in the seventh embodiment, processes performed at the same steps are assigned reference numerals with the same last numbers and descriptions of such processes in detail are omitted. Specifically, the processes performed at Steps S121 to S128, S1211, and S1212 illustrated in FIG. 31 correspond to the processes performed at Steps S111 to S118, S119, and S1110 illustrated in FIG. 30, respectively. Furthermore, the processes performed at Steps S129 and S1210 illustrated in FIG. 31 correspond to the processes performed at Steps S109 and S1010 illustrated in FIG. 29, respectively.

[i] Ninth Embodiment

In the following, a ninth embodiment will be described. The configuration of a wireless communication system according to the ninth embodiment is the same as that of the wireless communication system according to the seventh embodiment illustrated in FIG. 24. Furthermore, the configuration of each of a mobile station, a femto base station, and a macro base station according to the ninth embodiment is the same as that of the mobile station 10, the femto base station 20, and the macro base station 30, respectively, according to the seventh embodiment. Accordingly, in the ninth embodiment, components having the same configuration as those in the seventh embodiment are assigned the same reference numerals and descriptions of such components in detail are omitted. The ninth embodiment differs from the seventh embodiment in that the femto base station 20 variably selects (or decides), in accordance with the mobile stations, whether to permit the operation control with respect to the own station.

Figure 32:
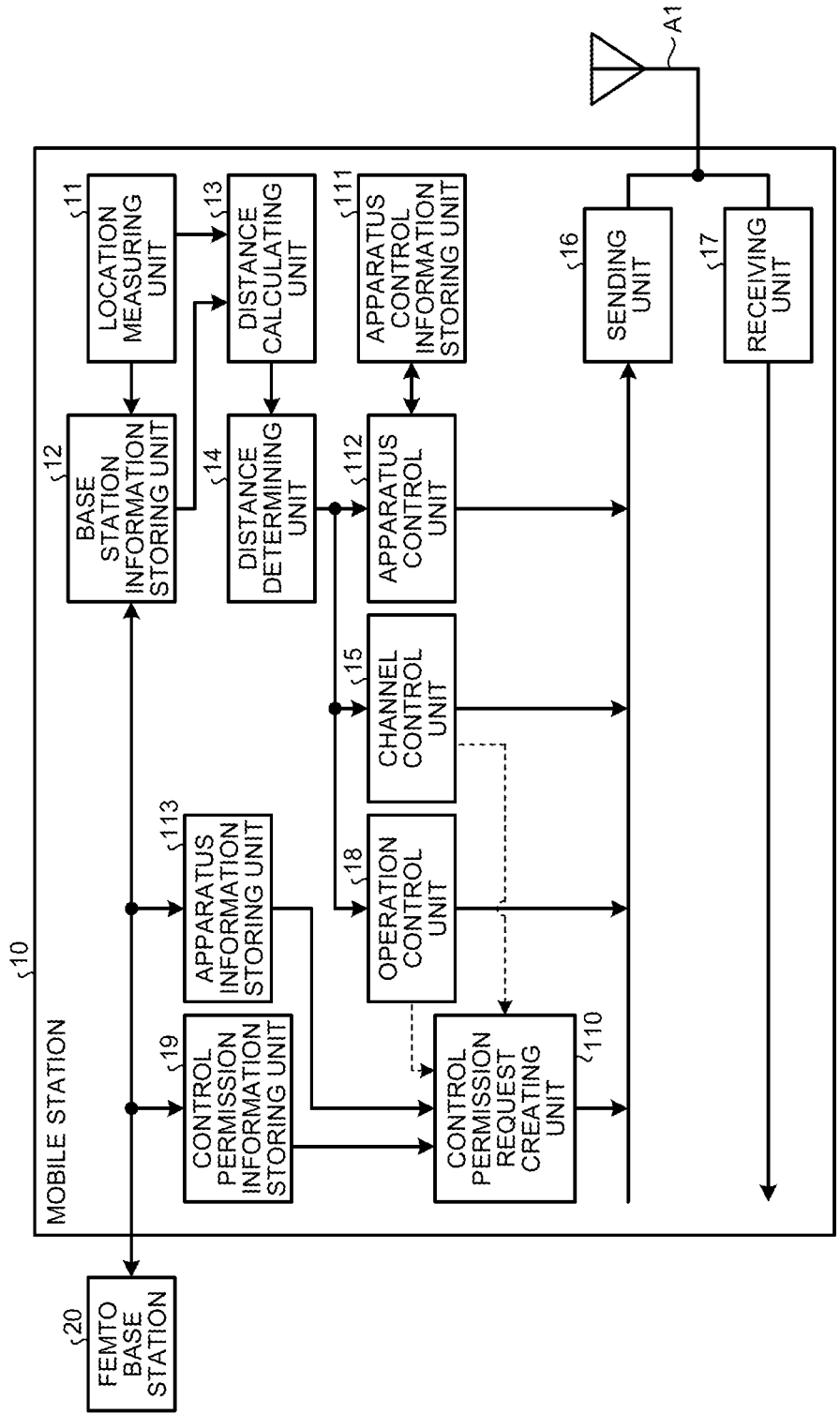
FIG. 32 is a schematic diagram illustrating an example of the functional configuration of a mobile station according to a ninth embodiment.

FIG. 32 is a schematic diagram illustrating an example of the functional configuration of the mobile station 10 according to the ninth embodiment. As illustrated in FIG. 32, the mobile station 10 may also have the configuration in which the mobile station according to the sixth embodiment (see FIG. 21) is combined with the mobile station according to the seventh embodiment (see FIG. 25). In FIG. 32, components having the same configuration as those in the sixth and the seventh embodiments are assigned the same reference numerals and descriptions of such components in detail are omitted. In particular, the control permission information storing unit 19 stores therein an identification code for allowing the operation control with respect to the femto base station 20 or a command for receiving permission to perform the operation control as control permission information. The control permission request generating unit 110 generates information for requesting permission to perform the operation control with respect to the femto base station 20. The apparatus control information storing unit 111 stores therein information (for example, an identifier of an apparatus, control content, and a control command) that is used to control the apparatus 80 as apparatus control information. The apparatus control unit 112 determines, based on the comparison result input from the distance determining unit 14, whether the control with respect to the apparatus 80 is needed. If it is determined that the control is needed, the apparatus control unit 112 generates an apparatus control signal. An apparatus information storing unit 113 stores therein information (for example, identification information on the apparatus 80) that is used to specify the apparatus targeted for the control.

Figure 33:
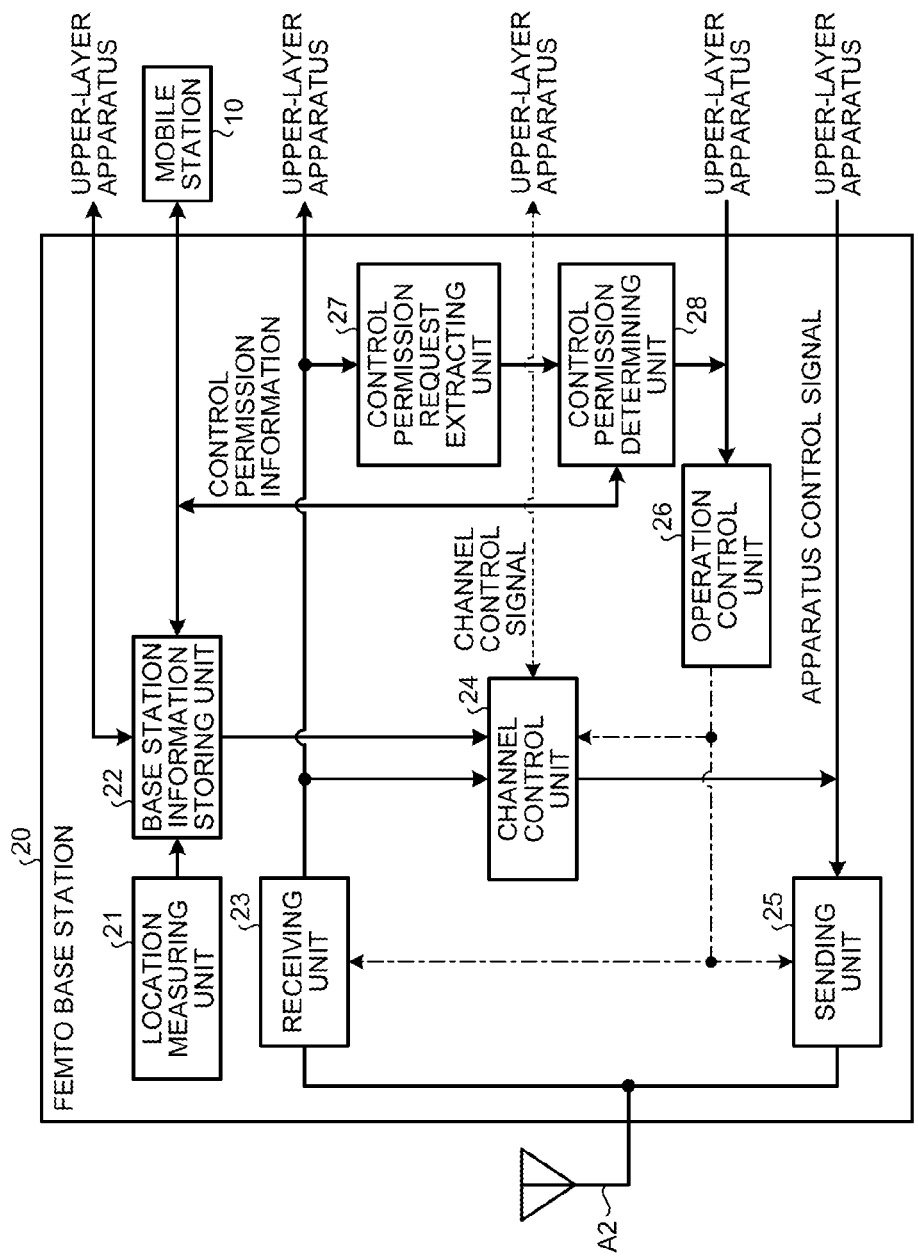
FIG. 33 is a schematic diagram illustrating an example of the functional configuration of a femto base station according to the ninth embodiment.

FIG. 33 is a schematic diagram illustrating an example of the functional configuration of the femto base station 20 according to the ninth embodiment. As illustrated in FIG. 33, the femto base station 20 may also have the configuration in which the femto base station according to the sixth embodiment (see FIG. 22) is combined with the femto base station according to the seventh embodiment (see FIG. 26). In FIG. 33, components having the same configuration as those in the sixth and the seventh embodiments are assigned the same reference numerals and descriptions of such components in detail are omitted. In particular, the control permission request extracting unit 27 extracts a control permission request from the information received from the mobile station 10 or the macro base station 30. The control permission determining unit 28 determines, in accordance with the control permission request, whether the operation control with respect to the femto base station 20 is permitted and outputs the determination result thereof to the operation control unit 26 that is arranged downstream.

FIG. 34 is a schematic diagram illustrating an example of the functional configuration of the macro base station 30 according to the ninth embodiment. As illustrated in FIG. 34, the macro base station 30 may also have the configuration in which the macro base station according to the sixth embodiment (see FIG. 23) is combined with the macro base station according to the seventh embodiment (see FIG. 27). In FIG. 34, components having the same configuration as those in the sixth and the seventh embodiments are assigned the same reference numerals and descriptions of such components in detail are omitted. In particular, the control permission request extracting unit 39 extracts the control permission request described above from the information that has been received from the mobile station 10. The control permission determining unit 310 determines, in accordance with the control permission request, whether the operation control with respect to the femto base station 20 is permitted and then outputs the determination result thereof to the control permission information generating unit 312 that is arranged downstream. The control permission information storing unit 311 stores therein an identification code for allowing the operation control with respect to the femto base station 20 or a command for receiving permission to perform the operation control as control permission information. The control permission information generating unit 312 generates the control permission information described above. The generated information is associated with the identification information on the mobile station that is the request source of the control permission and is then sent to the femto base station 20 by the sending unit 33. The apparatus control information storing unit 313 stores therein apparatus control information, such as, an identifier for an apparatus, control content, and a control command, that has previously been acquired from the mobile station 10 or the femto base station 20. In accordance with the control request for an apparatus from the mobile station 10, the apparatus control unit 314 generates an apparatus control signal that is used to control the apparatus 80 and also instructs the sending unit 33 to send the apparatus control signal to the femto base station 20.

Twelfth Modification

The wireless communication system 3 may also combine the distance determining process according to the third embodiment with the ninth embodiment described above. Namely, for the operation control with respect to the femto base station 20, instead of performing the operation control in accordance with the request from the mobile station 10, the macro base station 30 may also determine, by itself, whether the operation control is needed based on the distance acquired from the mobile station 10. Furthermore, by using the location information on the mobile station 10 and the location information on the femto base station 20, the macro base station 30 may also calculate the distance by itself. In such a case, the location information on the femto base station 20 may also be acquired from the femto base station 20 or may also be acquired via the mobile station 10. With this method, it is possible to obtain the same effect as that performed in the first to the ninth embodiments, i.e., a reduction in time needed for a handover can suppress a reduction in the transmission speed, and thus the quality of transmission can be improved.

As described above, each of the wireless communication systems 1 to 3 includes the mobile station 10, the femto base station 20 that can be communicate with the mobile station 10, and the macro base station 30 that can be communicate with the mobile station 10. The mobile station 10 includes the location measuring unit 11, the distance calculating unit 13, and the sending unit 16. The location measuring unit 11 measures the location of the mobile station 10. The distance calculating unit 13 calculates the distance between the mobile station 10 and the femto base station 20 by using the location described above measured by the location measuring unit 11 and by using the location of the femto base station 20. If the distance calculated by the distance calculating unit 13 becomes equal to or less than a predetermined first threshold, the sending unit 16 sends a request signal to the macro base station 30 that is used to request the setting of the channel between the macro base station 30 and the femto base station 20. The macro base station 30 includes the receiving unit 31, the channel control unit 32, and the sending unit 33. The receiving unit 31 receives the request signal described above that has been sent by the sending unit 16. If the request signal is received by the receiving unit 31, the channel control unit 32 sets a channel passing from the macro base station 30 to the femto base station 20. By using the channel that has been set by the channel control unit 32, the sending unit 33 sends a notification signal to the femto base station 20 indicating that the channel has been set. The femto base station 20 includes the receiving unit 23 and the channel control unit 24. The receiving unit 23 receives the notification signal described above that has been sent from the sending unit 33. If the notification signal described above has been received by the receiving unit 23, the channel control unit 24 sets the channel passing from the femto base station 20 to the macro base station 30.

Furthermore, preferably, in the wireless communication systems 1 to 3, if the distance calculated by the distance calculating unit 13 exceeds a predetermined second threshold, the sending unit 16 in the mobile station 10 sends, to the macro base station 30, a request signal for requesting the release of the channel between the macro base station 30 and the femto base station 20. If the request signal described above has been received by the receiving unit 31, the channel control unit 32 in the macro base station 30 may also release the channel passing from the macro base station 30 to the femto base station 20. At this time, the first threshold is, for example, about 30 to 100 m and the second threshold is, for example, about 10 to 50 m; however these thresholds do not always need to be the same.

More preferably, in the wireless communication systems 1 to 3, the mobile station 10 further includes the channel control unit 15 that decides to request the setting of a channel by using a different threshold in accordance with whether the network to which the femto base station 20 is connected is a public network or a dedicated network. In other words, in accordance with the type of networks, the channel control unit 15 changes the threshold to be used. Then, if the channel control unit 15 decides (selects) that the setting of a channel, the sending unit 16 in the mobile station 10 sends the request signal described above to the macro base station 30. Specifically, if the network to which the femto base station 20 is connected is a public network, it is assumed that the time needed to perform a handover is long. Because of this, by using the threshold greater than that used when a dedicated network is used for the femto base station 20, the mobile station 10 requests the setting of the channel at an earlier timing.

Similarly, in the wireless communication systems 1 to 3, the mobile station 10 further includes the channel control unit 15 that decides to request the setting of the channel described above by using a different threshold in accordance with whether the IP address of the femto base station 20 is a global address or a local address (a private address). In other words, in accordance with the type of addresses, the channel control unit 15 changes the threshold to be used. Then, if the channel control unit 15 decides to request the setting of the channel, the sending unit 16 in the mobile station 10 sends the request signal to the macro base station 30. Specifically, if the IP address of the femto base station 20 is a global address, it is assumed that the time needed to perform a handover is further long. Because of this, by using the threshold greater than that used when the IP address of the femto base station 20 is a local address, the mobile station 10 requests the setting of the channel at an earlier timing.

Furthermore, in the wireless communication systems 1 to 3, the mobile station 10 further includes the channel control unit 15 that decides to request the setting of the channel by using a different threshold in accordance with whether the IP address (for example, a local address) of the femto base station 20 is the IP address of the communication network that is different from the communication network to which the macro base station 30 belongs. In other words, in accordance with whether the femto base station 20 belongs to the same network as the network to which the macro base station 30 belongs, the channel control unit 15 changes the threshold to be used. Then, if the channel control unit 15 decides to request the setting of the channel, the sending unit 16 in the mobile station 10 sends the request signal to the macro base station 30. Specifically, if the IP address (for example, a local address) of the femto base station 20 and the IP address (for example, a local address) of the macro base station 30 are addresses in different mobile communication networks, it is assumed that longer time is needed to perform a handover. Accordingly, by using the threshold greater than that is used when the femto base station 20 and the macro base station 30 are present in the same network, the mobile station 10 requests the setting of the channel at an earlier timing.

As described above, in order to reduce the time needed to perform a handover from the macro base station 30 to the femto base station 20, the mobile station 10 sends a control request signal to the macro base station 30 when the power that is received from the macro base station 30 and that is measured and calculated in the mobile station 10 is higher than the power received from the femto base station 20. The macro base station 30 sets, in accordance with the request signal, the channel for the mobile station 10 between the femto base station 20 and the mobile station 10. Accordingly, the mobile station 10 approaches the femto base station 20, thereby the power received from the femto base station 20 exceeds the power received from the macro base station 30 and, when a handover can be performed, the channel has already been established. Consequently, by receiving a signal to the own station or sending and receiving data from and to the own station by using the set channel, the mobile station 10 can smoothly perform the handover from the macro base station 30 to the femto base station 20. Furthermore, in the description above, the power received from the macro base station 30 is simply compared with the power received from the femto base station 20. However, by adding an offset to the power received from the femto base station 20, the possibility of the handover to the femto base station 20 is made high. In this way, by previously setting an offset, a process of increasing the possibility of the handover to the macro base station 30 or to the femto base station 20 may also be performed.

Furthermore, in accordance with the result of determination whether the mobile station 10 approaches or moves away from the femto base station 20, if the mobile station 10 approaches the femto base station 20, the operation mode of the femto base station 20 is changed from the electrical power saving mode into the normal operation mode. In contrast, if the mobile station 10 moves away from the femto base station 20, the operation mode of the femto base station 20 is changed from the normal operation mode into the electrical power saving mode. Furthermore, by previously notifying only the specific mobile stations of a command for receiving permission, the femto base station 20 can limit the number of mobile stations that can connect to the femto base station 20. Similarly, the femto base station 20 can also limit the number of mobile stations so that the femto base station 20 can control the own operation. Furthermore, the information for allowing the operation control with respect to the femto base station 20 is notified to the mobile station 10 when, for example, a channel with the macro base station 30 that is currently being connected is set. Similarly to the channel control, when the operation control is performed, the wireless communication system 1 can also reduce the time needed for a handover. Furthermore, it is possible to improve a reduction in the transmission speed due to disconnection of the channel due to a handover.

Furthermore, before the connection between the mobile station 10 and the femto base station 20, the wireless communication systems 1 to 3 previously set a channel. However, data transmission using the set channel is not performed until the mobile station 10 is completely handed over from the macro base station 30 to the femto base station 20. Consequently, even if the mobile station 10 continues the communication with the macro base station 30 without actually performing a handover, the data addressed to the mobile station 10 remains in the macro base station 30 that is the base station before the handover is performed. Accordingly, even if the channel control according to each of the embodiments and modifications is performed, the occurrence of a data loss, such as a packet loss, can be suppressed. Consequently, the continuity or the reliability of communication can be ensured.

Furthermore, although not illustrated in the drawing, the embodiments and the modifications described above may also use the following method described below. For example, for sending and receiving information between the mobile station 10 and the femto base station 20, the mobile station 10 may also send a notification about the information (for example, the identification information, the IP address, telecommunications carriers, or the like) on the mobile station 10 or may also receive connection permission information by using either of the methods, i.e., a wired or wireless connection. Furthermore, it is assumed a method in which the femto base station 20 selects, from among the mobile stations that can be connected to the femto base station 20, a mobile station that is permitted, with priority, to connect; stores the information (hereinafter, referred to as "priority connection permission information") that is used to notify the mobile station of the selection; and provides the information. With this method, the sending and receiving of the priority connection permission information between the femto base station 20 and the mobile station 10 may also be performed by using a wired channel regardless of whether the wireless channel is used. For the mobile station that holds the priority connection permission information, the femto base station 20 permits the control of the connection to the own station, a channel, an operation, and an apparatus by giving priority higher than the other mobile stations.

Similarly, sending location information from the femto base station 20 to the mobile station 10 or providing control permission may also be performed by using either of the methods, i.e., a wired or wireless connection. Furthermore, although not illustrated in the drawings, the mobile station 10 may also convert an apparatus control signal in accordance with a predetermined protocol. With this method, the mobile station 10 includes at least an apparatus control signal generating unit that generates an apparatus control signal in accordance with the wireless communication protocol of the control signal addressed to the macro base station 30 and includes an apparatus control signal converting unit that converts the apparatus control signal to a signal that can be transmitted in the wireless communication systems 1 to 3.

Furthermore, in each of the embodiments and the modifications, it is assumed that, when, as a trigger, the mobile station 10 enters the area within a predetermined distance (for example, the distance threshold $L_{th1}$) from the femto base station 20, each of the wireless communication systems 1 to 3 immediately starts the channel control, the operation control, and the apparatus control. However, a user of the mobile station 10 does not always stay in the area in which the user once enters. Accordingly, the channel control, the operation control, and the apparatus control may also be performed only after the mobile station 10 continuously stays in the area for a predetermined time (for example, about one to ten minutes). Consequently, it is possible to avoid an unwanted control process due to a temporary stay of the user and thus a load applied to the system can be reduced. As a further modification method, each of the wireless communication systems 1 to 3 may also perform the process of the channel control, the operation control, the apparatus control, or the like only after it is detected that the mobile station 10 continuously approaches the macro base station 30 for the predetermined time (for example, about one to ten minutes). With this method, it is also possible to prevent a process due to the starting and the stopping of the control from frequently occurring and thus a load applied to the system can be reduced.

Furthermore, each of the embodiments and the modifications, each of the components in the mobile station 10, the femto base station 20, and the macro base station 30 is not always physically configured as illustrated in the drawings. In other words, the specific shape of a separate or integrated device is not limited to the drawings. Specifically, all or part of the device can be configured by functionally or physically separating or integrating any of the units depending on various loads or use conditions. For example, the distance calculating unit 13 and the distance determining unit 14, or the sending unit 16 and the receiving unit 17 in the mobile station 10 may also be integrated as a single unit. In contrast, the channel control unit 15 may also be separated by dividing it into a unit that decides (or selects) the control target and the content of the control and a unit that actually performs the control (a function of generating a control signal and sending the signal). Furthermore, for the femto base station 20 and the macro base station 30, the communication function may also be integrated or the channel control function may also be separated. Furthermore, the memories 10d and 20d may also be used as an external device of the mobile station 10, the femto base station 20, and the macro base station 30 and be connected via a network or by a cable.

Furthermore, in the above description, the configuration and the operation have been described for each embodiment. However, the wireless communication systems 1 to 3 according to each embodiment may also have a component specific to the other embodiments or the modifications. Furthermore, the combination for each of the embodiments and the modifications is not limited two. Any combination, such as three or more, may also be used. For example, a method of changing the distance threshold may also be used in the embodiments or the modification other than the first and the third embodiments depending on the type of networks to which the mobile station 10 is connected or the type of IP addresses of the mobile station 10. The function of providing, by the femto base station 20, of the priority connection permission information described above to the mobile station 10 may also be used in the embodiments and the modifications other than the sixth embodiment and the eighth modification. Similarly, the function of the mobile station 10 generating and converting an apparatus control signal in accordance with the protocol may also be used in the embodiments and the modifications other than the seventh embodiment and the ninth and the tenth modifications. Furthermore, a single wireless communication system may also have all of the components described in the first to the ninth embodiments and in the first to the twelfth modifications as long as combinations can be possible.

In the embodiments, the descriptions have been given with the assumption that the mobile station is a smart phone; however, the present invention is not limited thereto. Various communication devices, such as a mobile phone, a personal digital assistant (PDA), or the like, that can be handed over from the macro base station to the femto base station may also be used. Furthermore, the descriptions have been given with the assumption that femto base station is a small size base station; however, the present invention is not limited thereto. A base station that forms a micro cell or a pico cell may also be used. Alternatively, access points of a wireless LAN may also be used.

The distance threshold $L_{th}$~$L_{th12}$ described above is selected (or decided) by using, for example, the time needed for a handover of the mobile station 10 and the moving speed of the mobile station 10 as the parameters. Accordingly, the distance threshold is set to an appropriate value in accordance with the type of networks that is the move source and the move destination of a handover; the type of IP addresses, such as a global address, a local address, or the like, of the mobile station 10; or a moving method of a user. For example, if networks used for the move source and the move destination of the mobile station 10 differ and telecommunications carriers used also differ, each of the wireless communication systems 1 to 3 preferably sets the distance threshold to a higher value, for example, about 300 m to 1 km, so as to ensure that the time needed for the channel control is long. Furthermore, each of the wireless communication systems 1 to 3 may also properly use the distance threshold depending on an environment or a state, such as, if a user of the mobile station 10 moves on foot, the value between 20 to 100 m is set as the distance threshold $L_{th}$, whereas, if a user moves by car, the value between 500 m to 1 km is set as the distance threshold $L_{th}$.

Furthermore, in each of the embodiments and the modifications, mainly, the description has been given with the assumption that a handover is performed from the base station (the macro base station 30), which is connected to an intranet, to the base station (the femto base station 20), which is connected to a different intranet or connected to the Internet. However, the type of networks corresponding to the connection destination before a handover and the type of networks corresponding to the new connection destination due to the handover are not limited to the case described above. For example, each of the wireless communication systems 1 to 3 may also be used for a handover that is performed from a public network, such as the Internet or the like, to a dedicated network, such as an intranet, an ATM, or the like.

Furthermore, in each of the embodiments and the modifications, the femto base station 20 limits, from among the mobile stations that can be connected to the femto base station 20, the mobile stations that can request apparatus control in accordance with whether permission is received from the femto base station 20. Such a control permission/rejection control function is not limited to the control with respect to an apparatus. The function may also be similarly used for the control with respect to a channel or behavior. Consequently, it is possible to reliably prevent a case in which an unwanted channel is set or a channel is erroneously deleted because an unexpected user enters a mobile station, or a case in which the femto base station 20 changes into the normal operation mode and thus the electrical power consumption is increased even though a user of the mobile station 10 does not return home yet.

According to an aspect of an embodiment of a wireless communication system disclosed in the present invention, an advantage is provided in that the time needed for a handover between base stations can be reduced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system comprising:
   a mobile station;
   a first base station that communicates with the mobile station; and
   a second base station that communicates with the mobile station, wherein the mobile station includes
      a measuring unit that measures a location of the mobile station,
      a calculating unit that calculates, by using location information measured by the measuring unit and location information on the first base station, a distance between the mobile station and the first base station, and
      a first sending unit that sends, to the second base station based on the distance calculated by the calculating unit and a predetermined first threshold, a request signal that is used to request setting of a channel between the second base station and the first base station, and
   the second base station includes
      a first receiving unit that receives the request signal sent by the first sending unit,
      a first control unit that sets, when the request signal is received by the first receiving unit, the channel between the second base station and the first base station, and
      a second sending unit that sends, to the first base station by using the channel set by the first control unit, a notification signal that indicates notification of the setting of the channel, and
   the first base station includes
      a second receiving unit that receives the notification signal sent by the second sending unit, and
      a second control unit that sets, when the notification signal is received by the second receiving unit, the channel between the first base station and the second base station, wherein
      the second control unit establishes a wired communication path for the mobile station, on a network side.

2. The wireless communication system according to claim 1, wherein
   when the distance calculated by the calculating unit exceeds a predetermined second threshold, the first sending unit in the mobile station sends a request signal that is used to request the release of the channel between the second base station and the first base station to the second base station, and
   when the request signal that is used to request the release of the channel is received by the first receiving unit, the first control unit in the second base station releases the channel between the second base station and the first base station.

3. The wireless communication system according to claim 1, wherein
   the mobile station further includes a deciding unit that decides, in accordance with whether a network to which the first base station is connected is a public network, to request the setting of the channel by using a different threshold, and
   when the deciding unit decides to request the setting of the channel, the first sending unit sends the request signal to the second base station.

4. The wireless communication system according to claim 1, wherein
   the mobile station further includes a deciding unit that decides, in accordance with whether an IP address of the first base station is a global address, to request the setting of the channel by using a different threshold, and
   when the deciding unit decides to request the setting of the channel, the first sending unit sends the request signal to the second base station.

5. The wireless communication system according to claim 1, wherein
   the mobile station further includes a deciding unit that decides, in accordance with whether an IP address of the first base station is an IP address of a communication network that is different from a communication network to which the second base station belongs, to request the setting of the channel by using a different threshold, and
   when the deciding unit decides to request the setting of the channel, the first sending unit sends the request signal to the second base station.

6. A mobile station that communicates with a first base station and a second base station, the mobile station comprising:
   a measuring unit that measures a location of the mobile station;
   a calculating unit that calculates, by using location information measured by the measuring unit and location information on the first base station, a distance between the mobile station and the first base station; and
   a sending unit that sends, to the second base station based on the distance calculated by the calculating unit and a predetermined threshold, a request signal that is used to request setting of a channel between the second base station and the first base station, wherein
   the first base station establishes a wired communication path for the mobile station, on a network side.

7. A base station that communicates with a mobile station, the base station comprising:
   a receiving unit that receives, based on a distance between the mobile station and another base station that is other than the base station and based on a predetermined threshold, a request signal that is sent from the mobile station and that is used to request setting of a channel between the base station and the other base station;
   a control unit that sets, when the request signal is received by the receiving unit, the channel between the base station and the other base station; and a sending unit that sends, to the other base station by using the channel set by the control unit, a notification signal that indicates notification of the setting of the channel, wherein the other base station establishes a wired communication path for the mobile station, on a network side.

8. A wireless communication method used in a wireless communication system that includes a mobile station, a first base station that communicates with the mobile station, and a second base station that communicates with the mobile station, the wireless communication method comprising:

measuring, performed by the mobile station, a location of the mobile station;

calculating, performed by the mobile station by using measured location information and location information on the first base station, a distance between the mobile station and the first base station;

sending, to the second base station performed by the mobile station based on the calculated distance and a predetermined threshold, a request signal that is used to request setting of a channel between the second base station and the first base station;

receiving, performed by the second base station, the request signal sent from the mobile station;

setting, performed by the second base station, when the request signal is received, the channel between the second base station and the first base station;

sending, to the first base station performed by the second base station by using the set channel, a notification signal that indicates notification of the setting of the channel;

receiving, performed by the first base station, the notification signal sent from the second base station;

setting, performed by the first base station, when the notification signal is received, the channel between the first base station and the second base station; and establishing, performed by the first base station, a wired communication path for the mobile station, on a network side.

9. A wireless communication method comprising:

measuring, performed by a mobile station that communicates with a first base station and a second base station, a location of the mobile station;

calculating, performed by the mobile station, by using measured location information and location information on the first base station, a distance between the mobile station and the first base station;

sending, to the second base station performed by the mobile station, based on the calculated distance and a predetermined threshold, a request signal that is used to request setting of a channel between the second base station and the first base station and establishing, performed by the first base station, a wired communication path for the mobile station, on a network side.

10. A wireless communication method comprising:

receiving, performed by a base station that communicates with a mobile station, based on a predetermined threshold and a distance between the mobile station and another base station that is other than the base station, a request signal that is sent from the mobile station and that is used to request setting of a channel between the base station and the other base station;

setting, performed by the base station, when the request signal is received, the channel between the base station and the other base station;

sending, to the other base station performed by the base station by using the set channel, a notification signal that indicates notification of the setting of the channel; and establishing, performed by the other base station, a wired communication path for the mobile station, on a network side.

* * * * *